May 17, 1955

T. NIETER 2,708,417

APPARATUS FOR COATING A PLURALITY
OF MEMBERS IN A CONTINUOUS ORDER

Filed June 2, 1952

INVENTOR.
Temple Nieter
BY
Foorman L. Mueller
Atty.

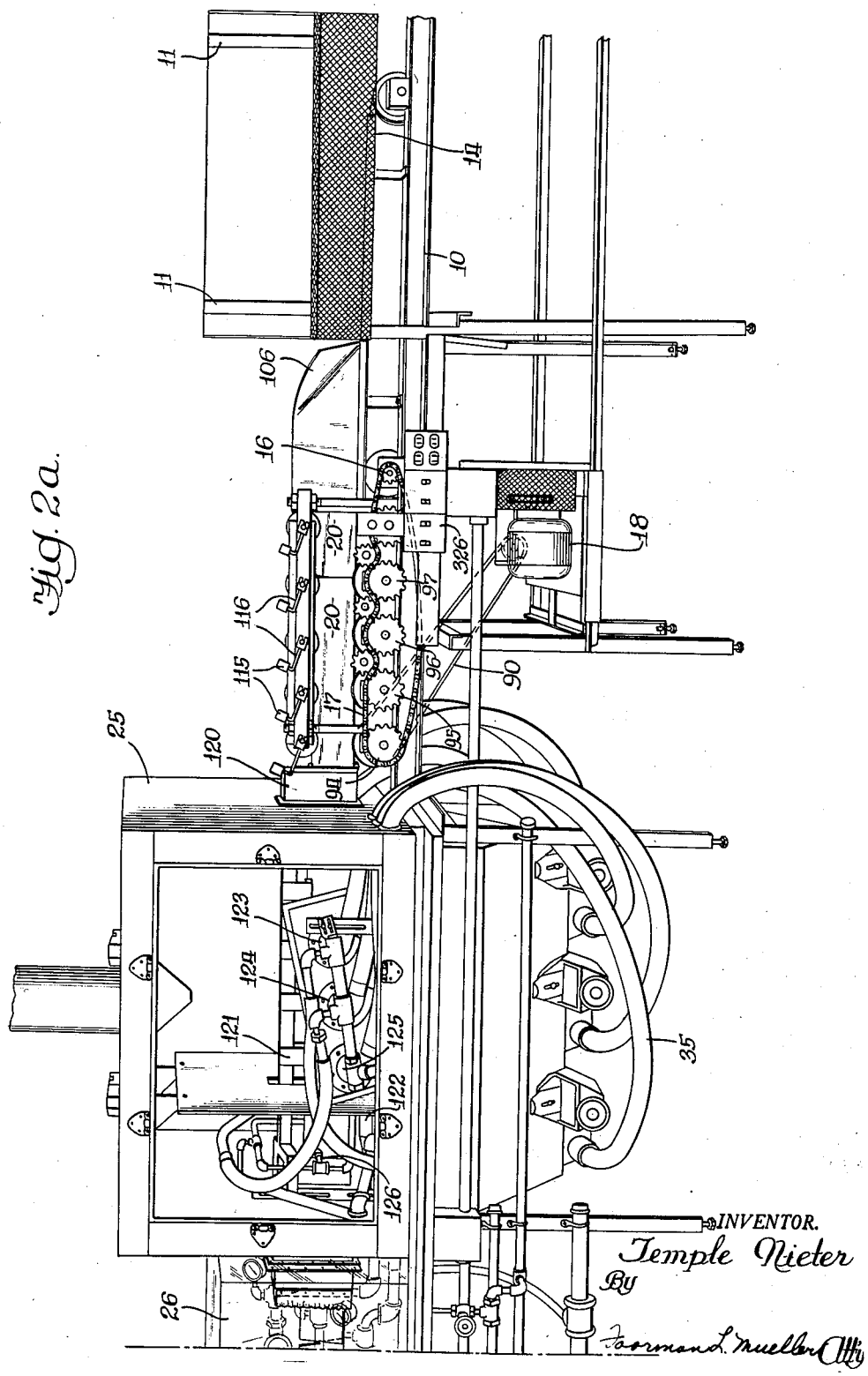

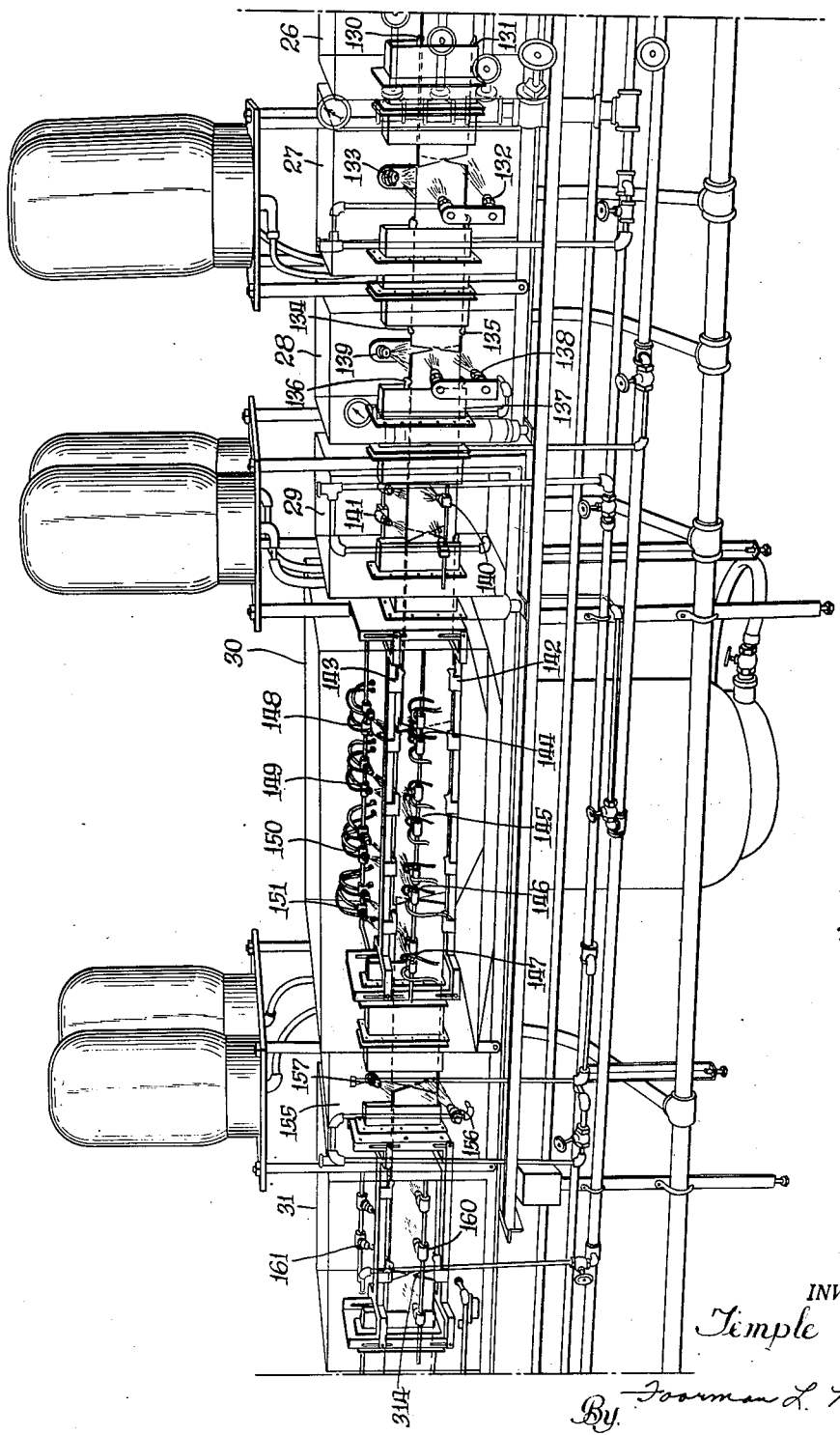

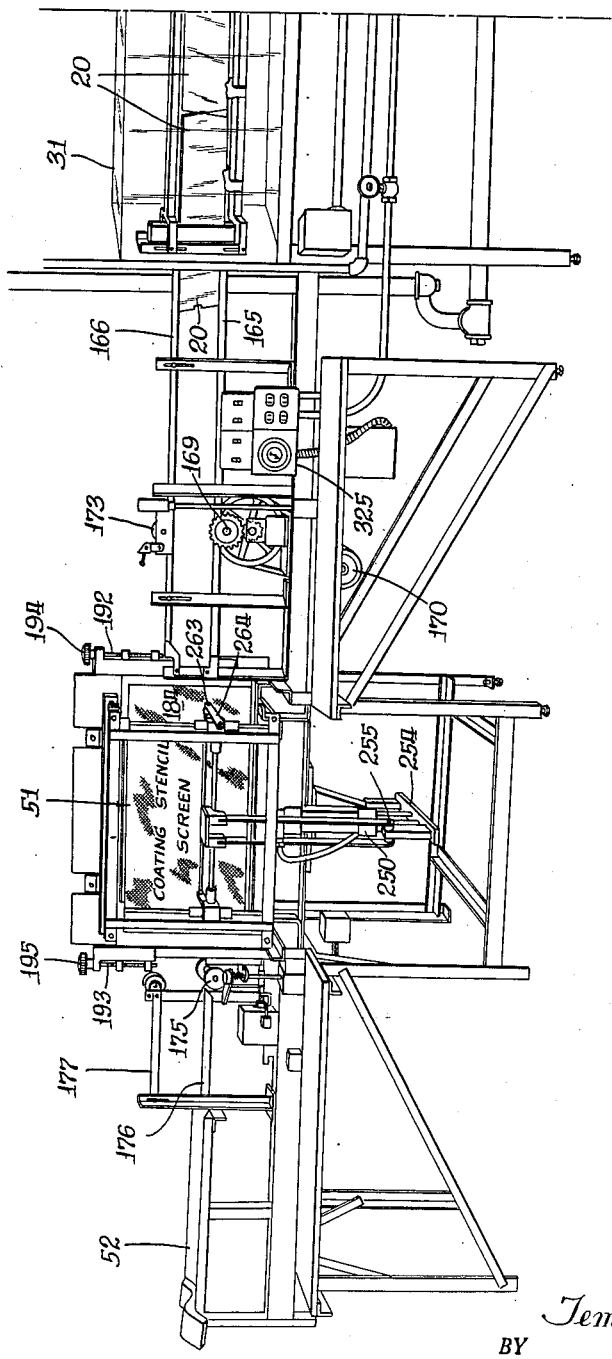

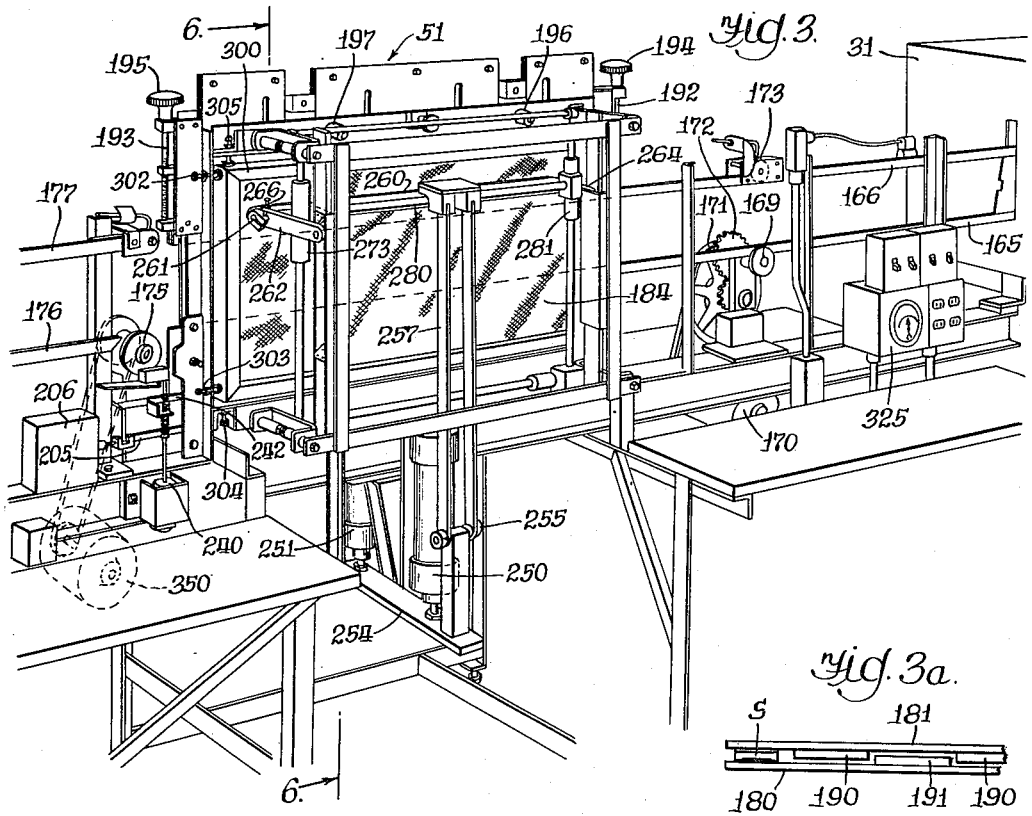
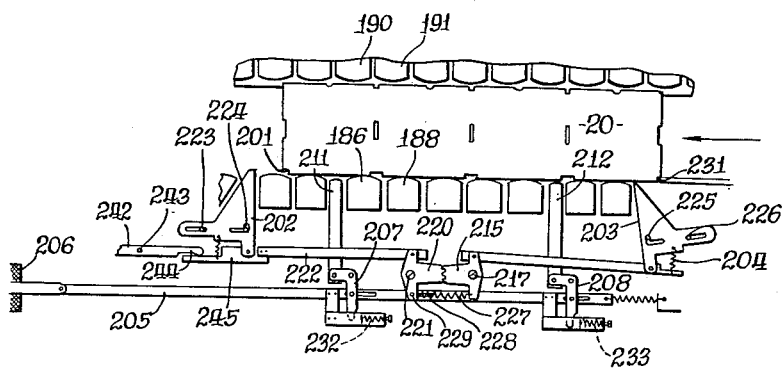
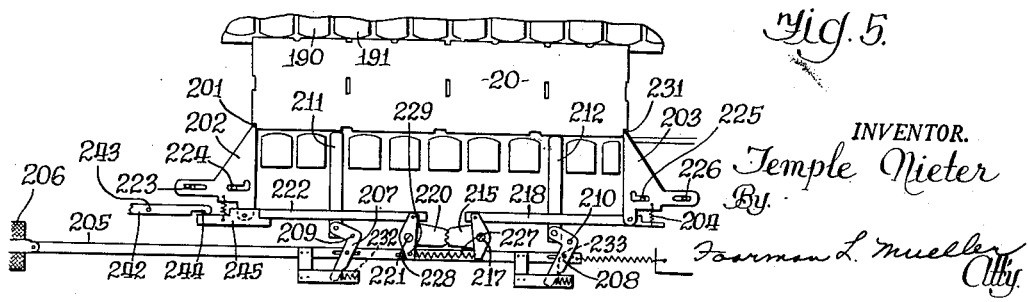

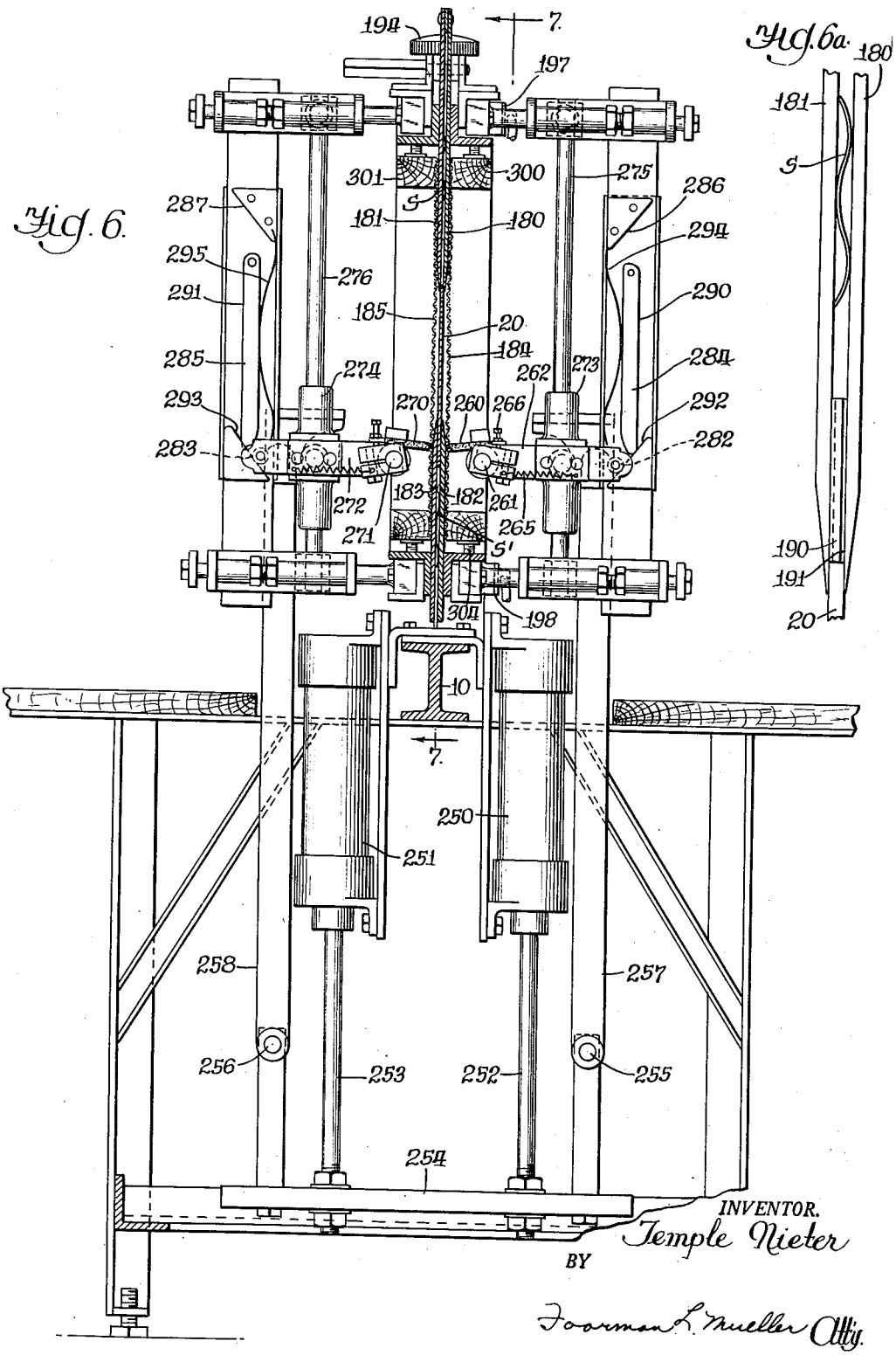

May 17, 1955

T. NIETER 2,708,417

APPARATUS FOR COATING A PLURALITY
OF MEMBERS IN A CONTINUOUS ORDER

Filed June 2, 1952

INVENTOR.
BY Temple Nieter

Foorman L. Mueller Atty.

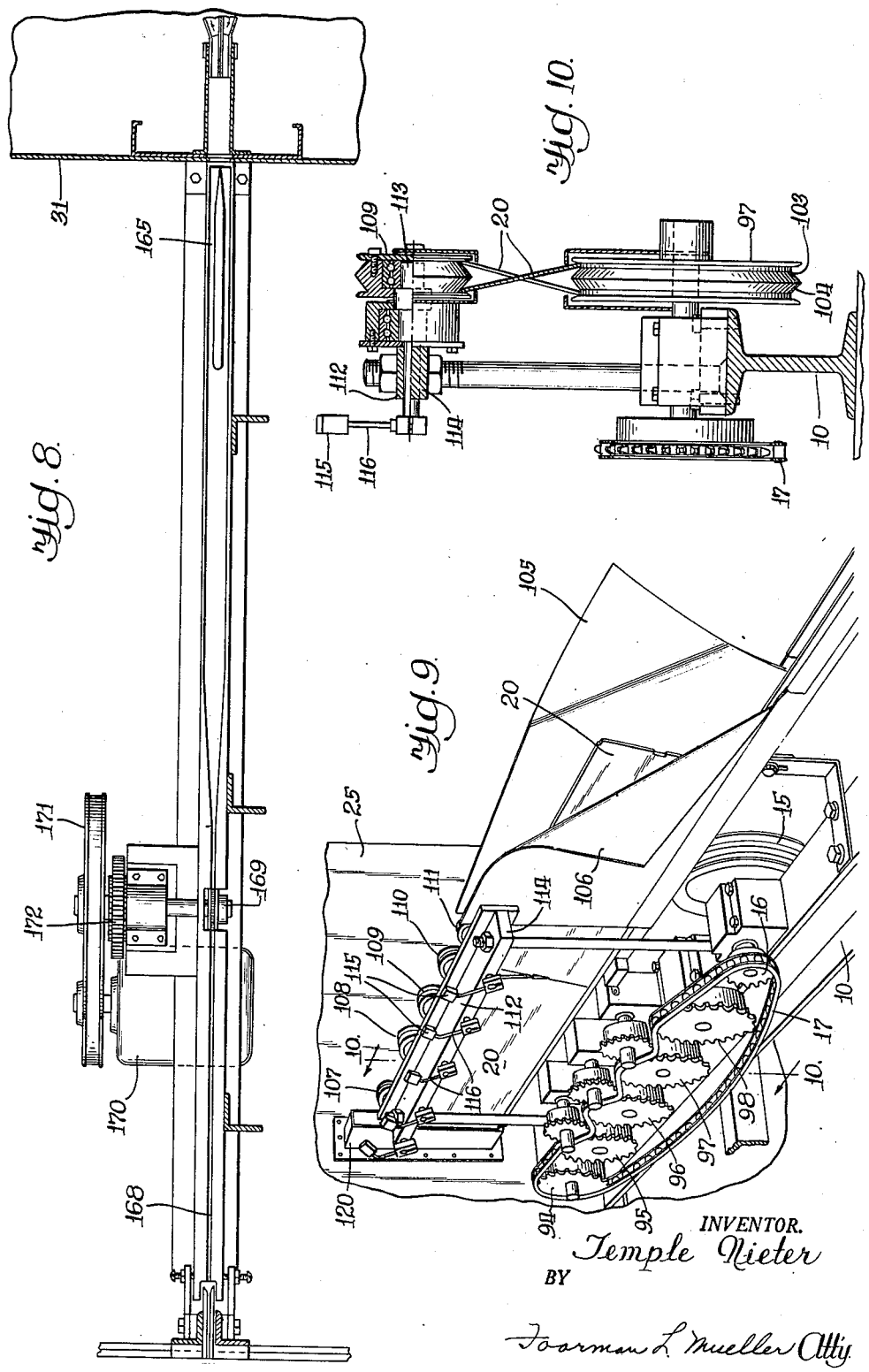

May 17, 1955
T. NIETER
2,708,417
APPARATUS FOR COATING A PLURALITY
OF MEMBERS IN A CONTINUOUS ORDER
Filed June 2, 1952
12 Sheets-Sheet 9
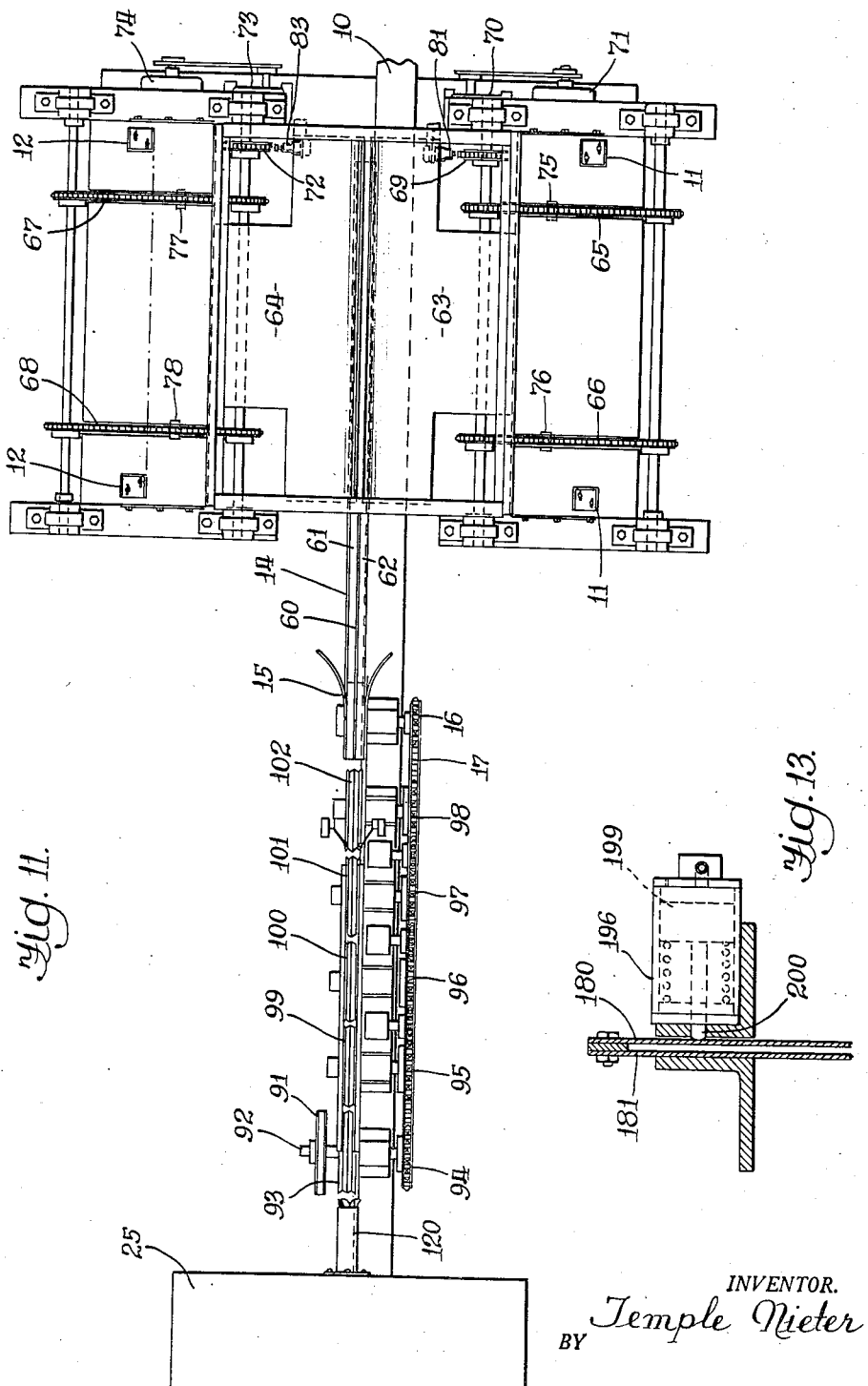
INVENTOR.
BY Temple Nieter
Voorman L. Mueller Atty.

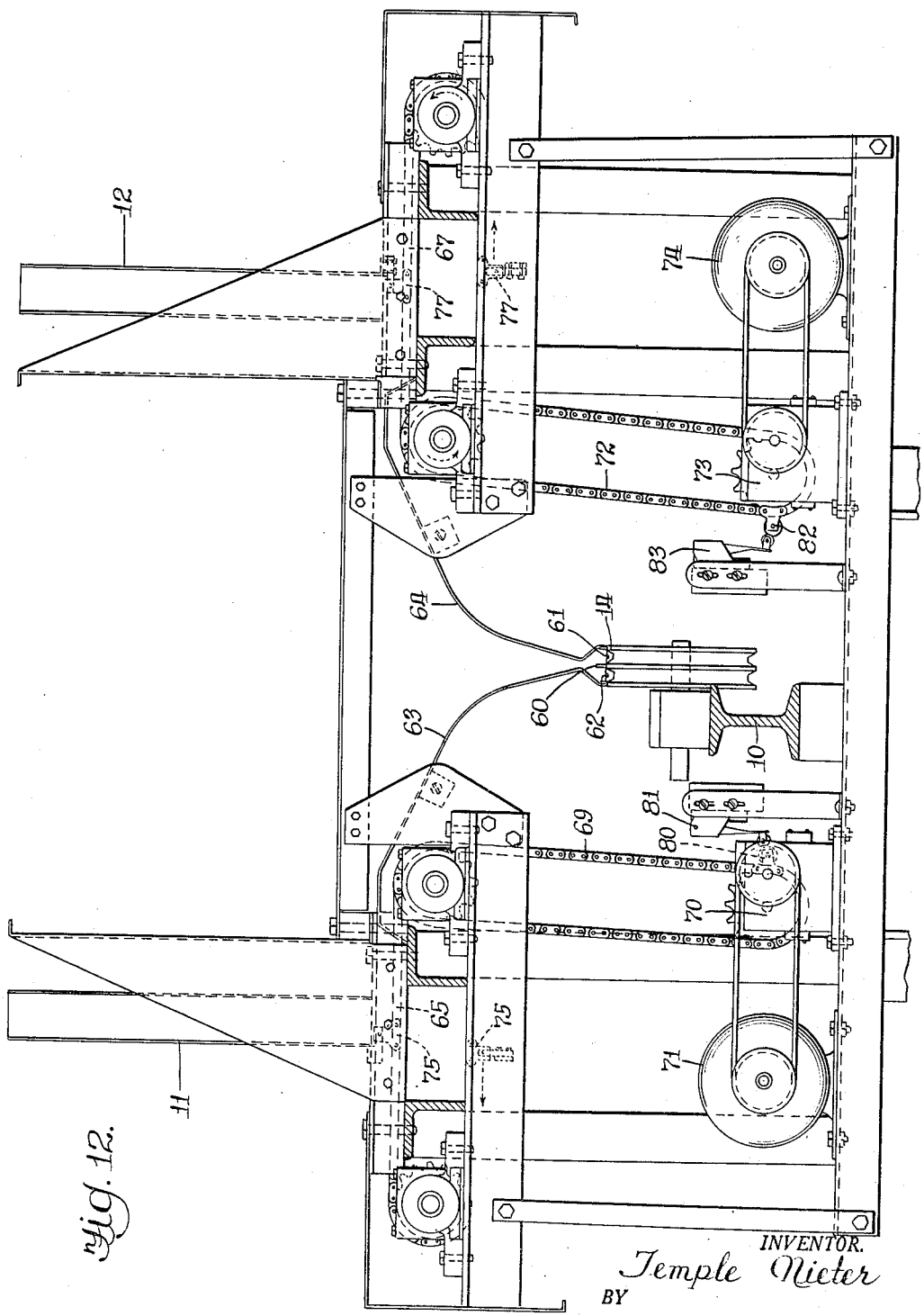

May 17, 1955

T. NIETER 2,708,417

APPARATUS FOR COATING A PLURALITY
OF MEMBERS IN A CONTINUOUS ORDER

Filed June 2, 1952

INVENTOR.
Temple Nieter
BY
Foorman L. Mueller Atty.

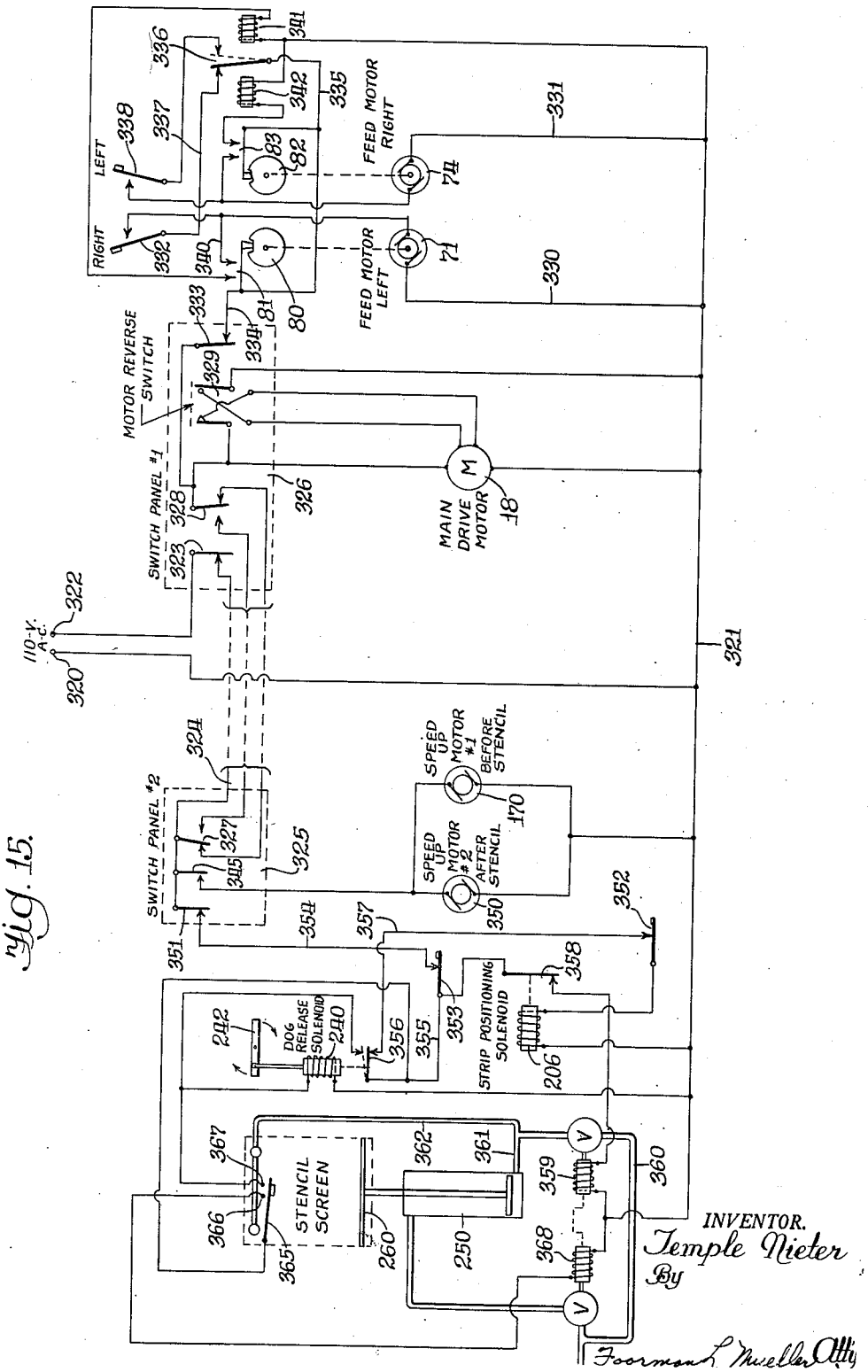

United States Patent Office 2,708,417

Patented May 17, 1955

2,708,417

APPARATUS FOR COATING A PLURALITY OF MEMBERS IN A CONTINUOUS ORDER

Temple Nieter, Evanston, Ill., assignor to Motorola, Inc., Chicago, Ill., a corporation of Illinois Application June 2, 1952, Serial No. 291,131

16 Claims. (Cl. 118—11)

The present invention relates to coating machinery, and more particularly to a machine apparatus for automatically preparing and coating a plurality of sheet-like members or strips in a series of continuous steps performed in rapid succession.

A recently developed manufacturing technique in the radio, television, and electronic component arts is to use a chassis member having a so-called printed circuit thereon in an effort to simplify the assembly procedures in manufacturing an electrical chassis unit. Such printed circuit chassis member may be comprised of a sheet or strip of insulating material having a coating of a variegated design of conducting material thereon. The variegated design of conductive coating on the insulating chassis sheet is used electrically to interconnect the various electrical components that may be secured to the chassis sheet. The formation of the variegated design of conductive material on the chassis sheet or member for the purpose of accomplishing electrical interconnection may be obtained by various methods. However, the sheet of insulating material must ordinarily be preliminarily prepared for the final step wherein a conductive pattern emerges on the sheet, and this preliminary preparation has, in the past, required rather slow hand labor.

An object of my invention is to provide a coating machine for providing one or more coatings on all exposed surfaces of a plurality of sheet-like members in rapid succession and all by automatically initiated operations.

A further object of the invention is to provide a coating machine for simultaneously coating each of both face sides of a sheet-like member with a coating of predetermined variegated design.

Another object of my invention is to provide a machine into which a plurality of sheet-like members are fed at one end thereof, and which will automatically process the sheet-like members over the extent of the machine so as to project them from the machine at the other end with at least one coating thereon and ready to be plated with an electrical conductive circuit pattern.

Another object of my invention is to provide a machine into which a plurality of sheets of insulating material are fed, and which will thereafter in a continuous automatic operation prepare and eject each sheet so that the sheets emerge from the machine with a variegated design on each side thereof, defining on each such side the pattern for application of metal electrical conducting paths thereto which will serve as so-called printed circuits on each of the sheets.

It is also an object of my invention to provide a machine to accommodate a train of sheet-like insulating members adapted to stand upright in the machine and expose the two opposite face surfaces, and provide means to automatically move the members as a continuous train through the machine.

A still further object of the invention is to provide a coating machine for successively preparing each of a plurality of sheet-like members of insulating material in rapid succession for coating with an underlying metal coating on all exposed surfaces, thereafter applying the underlying metal coating, and finally applying an overlying coating of variegated design of lacquer or other insulating material on opposite face sides of successive ones of said previously metal coated members, all in a continuous controlled operation.

A feature of the present invention is to provide a processing and coating machine for automatically and successively producing a first underlying coating on all exposed surfaces of a plurality of sheet-like insulating members, and a second overlying coating of variegated design on opposite face sides of the plurality of sheet-like members, all in rapid succession in a continuous operation.

Another feature of the invention is the novel machine arrangement to enable formation of a train of sheet-like members to be coated with the members supported in a generally vertical plane on their side edges and with successive ones of the members tilted in opposite directions to the vertical whereby a positive push connection is established between successive members so that the train of members thus formed may be pushed through a succession of treating and coating cabinets by suitable driving means positioned externally of the cabinets.

A further feature of the invention is the provision of means to form a train of sheet-like members to be coated, with the members supported in a generally vertical plane for movement along their side edges, together with driving means for pushing the train of members thus formed along a longitudinally extending series of discontinuous track supports positioned to extend through coating stations on each side of the track for applying a coating of metal or other coating materials on all exposed surfaces of the sheet-like members of the train as they span the track supports in their movement through the coating stations.

A still further feature of the invention is the novel arrangement of discontinuous track supports extending through a series of treating and coating cabinets, each track support having double grooves in side-by-side relation, the track supports being positioned above and below the plane of movement of a train of sheet-like members to be pushed through the cabinets, the double groove track supports functioning to maintain the positions of the sheet-like members in the train in generally vertical planes with successive ones of the members tilted in alternating opposite directions to the vertical, thus to maintain the push connections for the train of members where the successively placed tilted members cross one another and engage at one point in an edge.

Another feature of the invention is the provision of a machine into which sheet-like members may be fed to stand in a vertical position and generally in end-edge to end-edge engagement, and then to be automatically carried through the machine through at least two stations, in one of which is applied a metal coating to each side of each sheet-like member, and in another of which stations is applied simultaneously to each side of each member and on top of the first coating, removable material arranged in a predetermined pattern thereon.

A further feature is the provision of a machine for coating and processing both sides of sheet-like insulating material members which has a pair of parallel conveyor tracks side-by-side to accommodate the sheet-like members in a slightly tilted position so that alternate members form an engaged train through the machine, but with the conveyor tracks disposed relative to work stations in the machine in such a way that they do not in any way interfere with coating work done on both faces of the vertically positioned members and over the entire such faces thereof; and A still further feature of my invention is the provision of conveyor means in a machine for a plurality of continuously moving sheet-like members arranged on their edges in a vertical position and alternately tilted slightly so that alternate members engage in a point contact at adjacent edges and move like a train through the machine by virtue of the conveyor means and such edge-to-edge contact.

Further objects, features and the attending advantages of the invention will be apparent with reference to the following specification and drawings in which:

Figs. 2a, 2b and 2c are side elevational views with some of the cabinets in phantom, and breaking up the machine of Fig. 1, in 3 sections to show more of the details of the complete machine of the latter figure.

Fig. 3 is a fragmentary perspective of the stencil screen coating portion of the machine with the squeegee in the uppermost position of its reciprocatory movement;

Fig. 3a is a fragmentary plan view of the spring plates shown particularly in Figs. 4, 5 and 7, and in the present figure showing the construction permitting transverse movement thereof;

Fig. 4 is a detail of the spring dog aligning lever system for positioning a sheet-like member to be coated between the stencil screens with the levers in the position to receive a member;

Fig. 5 is similar to Fig. 4 but shows the levers in the aligning position;

Fig. 6 is a cross section on the line 6—6 of Fig. 3;

Fig. 6a is an enlarged fragmentary end elevational view of the spring plates and spring of Fig. 6;

Fig. 8 is a fragmentary top-plan view of the merging track supports and driving means immediately preceding the stencil coating machine;

Fig. 9 is a fragmentary perspective of the driving means for the train of members to be coated;

Fig. 10 is a section on the line 10—10 of Fig. 9;

Fig. 11 is a top plan view of the magazine feed means;

Fig. 12 is an end view of the magazine feed means;

Fig. 13 is a detail of the air cylinders for gripping the sheet-like member in the aligned position between the coating screens;

Fig. 15 is a wiring diagram of an electrical control circuit for enabling the automatic operation of the machine.

Figure 1:
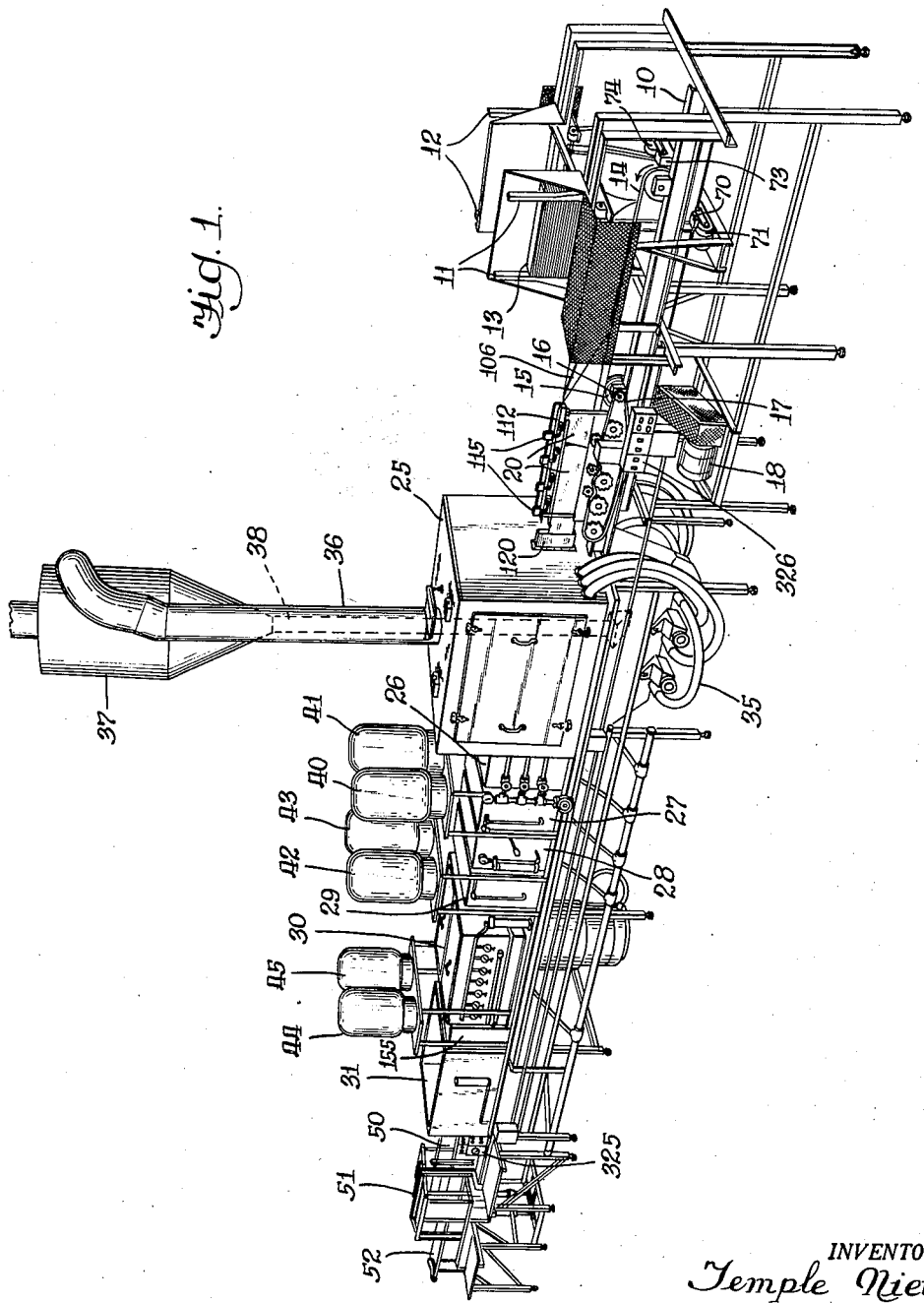
Figure 1 is a perspective view showing the general arrangement of the complete coating machine wherein sheets of members to be treated are automatically fed from a stack at the right end, as viewed in the drawing, and then automatically moved through the entire machine to the lefthand end where they are accumulated for removal.

The coating machine of the invention includes broadly means for forming a train of sheet-like strip members to be coated and for driving and pushing the train through various containers to treat and coat the strip members in the train. The arrangement is such that no conveyors or driving mechanisms are required within the various treating and coating sections of the machine. A first longitudinally moving conveyor is used initially to form the train of sheet-like members. The conveyor is provided with a longitudinally extending dividing ridge on its conveyor surface to provide two conveying tracks. The sheet members to be coated are stacked in two magazines each positioned on opposite sides of the conveyor, respectively. Means is provided to feed alternately in timed succession a sheet member from first one magazine and then the other to the conveyor surface with each of the sheet members supported on one of its side edges in a generally vertical plane to form a train of members for movement by the conveyor. Successive ones of the sheet members are fed to opposite sides of the dividing ridge of the conveyor and guide means is provided to tilt successive members in opposite directions to the vertical whereby a criss-cross driving push connection is obtained between the strip members in the train of members thus formed.

Driving means consisting of a plurality of double grooved positively rotated rollers is arranged to receive the train of members moved by the conveyor, and such rollers each have knurled surfaces which function positively to push the train of members through the treating and coating cabinets to follow. The grooved rollers are rotated at such speed as to impart a pushing movement to the train with less speed of movement than the moving speed of the conveyor so that positive driving connections without any gaps are established between all successive members in the train of members. A plurality of longitudinally spaced discontinuous track supports are positioned above and below the path of movement of the train of members from the driving means to guide the movement of the train through the coating cabinets. The track supports are double grooved with a generally W-shaped cross-section to receive and guide the oppositely tilted members in the train of members, and the supports are spaced from each other by a distance less than the length of each member to enable the members to span the track supports as they are pushed along the track.

The track supports extend through a plurality of treating and coating cabinets including a first cabinet for sand blasting and air blowing the surfaces of the members; a second cabinet for separating the sand blast cabinet from successive cabinets; a third cabinet for spray rinsing the members; a fourth cabinet for applying a liquid chemical sensitizer spray which may be needed before applying a metal coating; a fifth cabinet for spray rinsing the members; a sixth cabinet for applying simultaneous sprays of metal salt solution and metal salt reducing solution to produce a metal coating on the exposed surfaces of the members; a seventh cabinet for spray rinsing the members; and final cabinets for air drying the members. The various sandblasting, air blowing, spray rinsing, and chemical spraying and coating nozzles are positioned on opposite sides of the path of movement of the train of members to provide overlapping coating areas and the provision of the discontinuous track supports assures that all exposed surfaces and side edges of the members will be coated.

The train of members pushed through the final air drying cabinets is received on a track support which narrows from the double track grooves of the discontinuous track supports to a single track groove slightly wider than the thickness of the members, thus serving to align the members vertically. As the train of members is pushed along the single track, successive ones of the members are brought into contact with a speed-up driving roller which advances such member ahead of the train of members. The advanced member makes a butt connection with a previously advanced member to force such member into coating position between a pair of vertically positioned and oppositely spaced stencil screens. At the same time the member previously positioned between the stencil screens is forced out of coating position or ejected, and is received on a second even faster speed-up driving roller which moves the ejected member beyond the end of the track where it is dropped in a horizontal position on a concavely curved receiving table. Various electric switches which are sensitive to the movement of the members along the track supports and single track means are arranged in a circuit to control the operation of the various driving means to obtain the desired sequence of operation.

Each member that is received in the coating position on the track means between the vertically mounted stencil screens is first positioned in alignment with the stencil screens by means of suitable spring dogs and lever controls therefor. This positioning is important so that the pattern to be coated on each side is positioned exactly as desired on the member face. Thereafter the member is firmly gripped by means of air cylinders for squeezing the side walls of the track means against the member. At the same time, a respective one of a pair of squeegees is brought into contact with a respective one of the stencil screens to press the screens against the opposite face sides of the member to be coated. Both of the squeegee members are simultaneously moved upward with the blades dragging against the surfaces of the stencil screens to apply lacquer-like coatings simultaneously through the stencil screens to opposite face sides of the member. It is understood that the stencil pattern on each screen may be different to subsequently provide a different conductive metal circuit on each side of the member. At the upper limit of the squeegee movement, the squeegee blades are moved away from the surface of the stencil screens and are reciprocated downward out of contact with the stencil screens until they reach the downward limit of their travel at which time they are moved inward and brought to rest in positions just contacting the lower ends of the stencil screens. At the same time, the member gripping air cylinders are released and the aligning spring dog is retracted to permit the ejection of the coated member. The sequence of operation of the aligning dogs, gripping cylinders, and squeegee reciprocation is all controlled by sensing switches and control circuits.

In Fig. 1 of the drawings the general arrangement of the complete coating machine of the invention is shown. The longitudinally extending main frame member or girder 10 is supported in a horizontal position on a plurality of supporting legs. The input end of the machine is shown at the right hand end of the drawing and includes a pair of magazines 11 and 12 for supporting a plurality of strip chassis members to be coated by the machine. A stack of such members is shown at 13 to be supported in the magazine 11 and it will be understood that a similar stack of members is supported in the magazine 12. Feeding means to be described later in detail are arranged to feed the members in alternate succession from the magazines 11 and 12 onto a longitudinally moving conveyor belt 14. The endless conveyor belt 14 is moved in the direction of the arrow by means of a drive pulley 15, sprocket gear 16, and sprocket chain 17 which is continuously driven by the electric motor 18 through suitable gear reduction driving mechanism, not shown. The endless conveyor belt surface terminates at the conveyor drive wheel 15 and a chassis member such as shown at 20 is advanced thereby onto a plurality of driving rollers which are rotated by means of the sprocket gears as shown.

The train of members thus formed is pushed through the first sand blast cabinet 25, the buffer cabinet 26, the spray rinsing cabinet 27, the chemical sensitizing spray cabinet 28, the spray rinse cabinet 29, the metal spray cabinet 30, and the spray rinse and air blast dry-off cabinet 31. The sandblast cabinet 25 is provided with a plurality of sandblast nozzles positioned on opposite sides of the path of movement of the train of members pushed therethrough, and flexible hoses such as shown at 35 may be provided for conveying sand from the bottom of the cabinet 25 to the sandblast nozzles. An exhaust pipe 36 extends upwardly to the cyclone separator 37 and sand separated thereby passes down through the pipe 38 to the bottom of the sandblast cabinet 25. The containers 40, 41 are provided for storing the chemical sensitizer solution; containers 42, 43 are adapted to contain the metal salt solution to be sprayed on the exposed surfaces of the train of members passed through the cabinet 30. Similarly the containers 44, 45 are adapted to contain a metal salt reducing solution to be sprayed simultaneously on all exposed surfaces of the train of members passing through the cabinet 30.

The train of members passing from the rinsing and dry-off cabinet 31 are thus coated on all exposed surfaces with a metal coating and are received on suitable single tracked driving mechanism generally shown at 50. The mechanism generally shown at 50 is effective to detach and advance successive ones of the train members into the stencil coating machine generally shown at 51. The stencil coating machine 51 includes a pair of vertically mounted and oppositely positioned stencil screens between which the advanced members are momentarily positioned to receive over the metal coatings, an overlying coating of lacquer or the like on each of the oppositely spaced sides thereof as applied through the stencil screens. After application of the overlying coating to each of the two opposite face sides of the member through the stencil screens, the member is ejected and received on the concavely curved delivery table 52 which is arranged to support the coated and printed member in a horizontal position along its side edges. The details of the single track driving mechanism 50 and stencil screen coating portion 51 of the machine will be later described in connection with other figures of the drawings.

Figs. 2a, 2b and 2c are side elevational views partly in phantom to show in greater detail the various sections of the machine from right to left respectively as previously indicated in the general layout of Fig. 1 of the drawings. The details of the magazine and the magazine feed mechanisms for initially forming the train of members to be coated will now be described in connection with Figs. 2a, 11 and 12 of the drawings. The endless conveyor belt 14 is shown to have a longitudinal dividing ridge 60 so that in effect two conveying grooves 61 and 62 are provided. Strip members to be coated which are fed from the container 11 are guided by the guide means 63 to be received in a generally vertical plane and supported along their side edges within the conveyor groove 61 and tilt to the left of vertical by a slight amount. Similarly, the strip members to be coated as supplied from the magazine 12 are fed to the guide means 64 to be received in a generally vertical position within the conveyor groove 62 and tilt to the right of vertical by a slight amount.

Positioned beneath each of the magazine racks 11 and 12 respectively, is a pair of endless feed conveyor chains 65—66, and 67—68. The pair of chains 65—66 are driven by means of a sprocket chain 69, gear reducer 70, and electric motor 71. Similarly the pair of feed chains 67—68 are driven by means of the sprocket chain 72, gear reducer 73 and electric motor 74. Feed dogs 75—76 are carried by the feed chains 65—66, and similar feed dogs 77—78 are carried by the feed chains 67—68. When the motor 71 is energized, the feed dogs 75—76 will engage the bottom member in the stack of members supported in the magazine 11 to feed such member onto the metal guide 63 which deposits the member in the generally vertical position on the groove 61 of the conveyor 14 with the member tilted to the left of vertical. A roller 80 contacting the actuating arm of the switch 81 is effective to deenergize the motor 71 upon completion of one cycle of movement for the feed dog 75. The operation of the feed dogs 77—78, and the feed chains 67—68 by the motor 74 is similarly obtained and controlled by means of the roller 82 and switch 83. As will be later described in more detail in connection with the control circuit shown in Fig. 15, the motors 71 and 74 are alternately energized to feed members to be coated from the magazines 11 and 12 in alternate succession thereby to form a train of such members to be moved by the conveyor 14 with successive ones of the members tilted in opposite directions to the vertical to provide a push connection between the members in train of members thus formed.

Referring now to Figs. 2a, 9, 10 and 11 of the drawings, the mechanism for driving the train of members moved from the conveyor 14 will be described. The electric motor 18 connected by means of the belt 90 to the pulley 91 is keyed to the axle 92 on which a double grooved drive pulley 93 is secured. A sprocket gear 94 is also secured to the axle 92 and the chain 17 connects the sprocket gear 94 with sprocket gears 95 to 98 inclusive, and sprocket gear 16. Double grooved driving pulleys 99 to 102 inclusive are adapted to be rotated with sprocket gears 95 to 98, respectively. The sprocket gear 16, which is of smaller diameter than sprocket gears 94 to 98, inclusive, is connected to rotate the drive pulley 15 for the endless conveyor belt 14. Since the sprocket gear 16 is of smaller diameter than sprocket gears 94 to 98, it is apparent that the drive pulley 15 for the conveyor belt 14 will be rotated at higher speed than the grooved drive pulleys 93, and 99 to 102. The chain of members including the member 20 is driven by the endless conveyor belt 14 onto the first double grooved drive pulley 102 which drives the train of members over the succeeding drive pulleys 101, 100, 99 and 93. All of the drive pulleys 93 and 99 to 102 are identical, and as shown in Fig. 10 of the drawings, they are provided with two peripheral grooved surfaces 103 and 104 which are preferably knurled in order to provide a good frictional driving contact with the longitudinal edges of the members in the train of members to be driven such as the member 20. Side guiding members 105 and 106 formed of sheet metal or the like are arranged to guide the movement of the members to be coated in their generally vertical plane from the conveyor 14 onto the drive rollers.

A plurality of freely rotatable double grooved rollers 107 to 111 inclusive are supported on a suitable framework 112 above the path of movement of the train of members over the drive rollers 93, and 99 to 102. Each of the freely rotatable double grooved rollers 107 to 111, is rotatably supported on an eccentrically mounted axle. A detail of one of the eccentric mounted axles is shown in Fig. 10 of the drawings wherein the roller 109 is carried on the eccentric axle 113 which is rotatably supported at 114 on the supporting frame 112. A weight 115 mounted on the end of the lever arm 116 tends to rotate the eccentrically mounted axle 113 in a direction to move the double grooved pulley 109 toward the double grooved drive pulley 97. Thus in such manner each one of the members, such as the member 20, of the train of members to be pushed through the coating machine is held against a knurled driving groove 104 of the double grooved pulley 97 to obtain a good driving connection therefor.

Referring now to Fig. 2a of the drawings, the train of members including the member 20 are advanced by the last double drive roller 93 through the opening 120 into the sandblast cabinet 25. Just inside opening 120, an overlapping series of rubber strips at each side of the track act to seal the members against sand passing them and out of the cabinet. A plurality of double grooved track members such as shown at 121 and 122, are mounted at longitudinally spaced positions above and below the path of movement of the train of members through the sandblast cabinet 25. Three sandblasting nozzles 123—125 are provided as shown and a similar group of sandblast nozzles not shown are positioned on the other side of the path of movement of the train of members through the sandblast cabinet 25. The track supports such as shown at 121 and 122 are longitudinally spaced from each other by a distance less than the length of each member 20 in a train of members so that each member spans adjoining track supports in its path of movement through the machine. After passing the sandblast nozzles the train of members passes through another seal curtain and between a pair of airblast nozzles including the nozzle 126 which are effective to blow off any adhering sand particles on the exposed surfaces of the members to be coated. It should be understood that the sandblast cabinet 25 is provided initially to roughen the exposed surfaces of the members to be coated in order that the coatings to be applied may be more firmly secured on the surfaces to be coated.

Referring now to Figs. 2a and 2b of the drawings, the train of members from the sandblast cabinet 25 is passed through the buffer cabinet 26 which serves no function except to separate the sandblast cabinet 25 from the succeeding coating cabinets to be described. It should be understood that all of the subsequent coating cabinets 26—31 as previously referred to in connection with Fig. 1 of the drawings, are provided with a plurality of discontinuous longitudinally spaced double-grooved track supports for guiding the path of movement of the train of members to be coated. For example such track supports are shown above and below the path of movement of the train of members through the cabinet 26 at 130 and 131 respectively. As shown in Fig. 2b the train of members passing through cabinet 27 is sprayed with a rinsing solution such as water from the nozzles 132 and 133 positioned on opposite sides of the path of movement of the members to be coated. The train of members passing through the cabinet 28 as guided by supports 134—137, is subjected to a spray of a chemical sensitizing solution as applied by nozzles 138 and 139. The sensitizing solution may comprise a solution of stannous chloride (SnCl$_2$) which when sprayed on the surfaces to be coated renders them more susceptible to the formation of a metal coating in the manner to be described. The train of members to be coated passing from the cabinet 28 enters the cabinet 29 for an additional water rinsing as provided by the nozzles 140 and 141. The further rinsing as provided in the cabinet 29 removes all but a trace of the sensitizing solution that has been previously applied to the exposed surfaces of the members to be coated.

The train of members to be coated passing from the cabinet 29 enters the metal coating cabinet 30. The path of movement of the train of members is guided by means of a plurality of longitudinally spaced discontinuous track supports such as shown at 142 and 143. A plurality of pairs of liquid spraying nozzles 144—147, and 148—151 are located on opposite sides respectively of the path of movement of the members through the metal coating cabinet 30. Each of a pair of nozzles includes one nozzle for spraying a metal salt solution and one nozzle for spraying a metal salt reducing solution simultaneously onto selected areas of the exposed surfaces of the members to be coated. Each pair of nozzles is aimed to converge sprays at the surface to be coated and successive pairs of nozzles are arranged to coat overlapping areas so that all exposed surfaces of the members to be coated will be spray coated. It should be apparent that the provision of the discontinuous longitudinally spaced supporting track members such as shown at 142 and 143 enables even the supporting side edges of the members to be sprayed with the coating fluids, and to provide drainage of fluids promptly. The train of members now coated with metal is passed through the cabinet 155 containing the water spray rinsing nozzles 156 and 157, and then into the final air drying cabinet 31 containing a plurality of airblast nozzles such as shown at 160 and 161.

Referring now to Figs. 2c and 8 of the drawings, the train of members including the member 20 after passing through the final airblast cabinet 31 is received on a continuous double track supporting member 165. The upper longitudinal edges of the train of members are guided by an upper double track supporting member 166. Both of the supporting track members 165 and 166 narrow from a double track to a single track groove, as shown at 168. A single high speed drive roller 169 is mounted in the lower track groove 168 and is adapted to be rotated upon energization of the electric motor 170 for driving through the pulley 171 and spur gearing 172. The drive roller 169 has a knurled surface on its peripheral groove which engages the bottom longitudinal edge of the advancing member in the train of members. In order to assure a good frictional engagement of the drive roller 169 with the member to be coated, an upper eccentrically mounted idler roller 173 is provided. The idler roller 173 is substantially the same as the idler roller previously described in connection with Fig. 10 of the drawings, except that the roller 173 is a single grooved roller.

As soon as the advancing member of the train of members reaches the high speed knurled driving roller 169, the advancing member is detached from the train of members and moved ahead at high speed along the single track 168 until the end of the member passes beyond the knurled drive wheel 169, following which the advancing member comes to rest. A space is thereby made ahead of the following member. Thereafter a subsequent member in the train of members from the airblast cabinet 31 is received on the high speed drive roller 169 and such member is advanced to move the previously advanced member into position between the stencil coating screens generally shown at 51 in Fig. 2c of the drawings. Thereafter a still subsequent member of the train of members from the airblast cabinet 31 is received on the high speed drive roller 169 and advances the preceding member into position between the stencil coating screen 51, which preceding member in advancing between the coating stencil screen also forces the previously coated member preceding it out of the position between the stencil screens and onto the high speed drive roller 175. The high speed drive roller 175 is driven at an even higher speed than the drive roller 169 and it very quickly advances the coated member from between the stencil screens generally shown at 51 along the tracks 176 and 177. The driving roller 175 is operated at such high speeds that the printed member received thereon is driven beyond the end of the tracks 176 and 177, and allowed to fall in a horizontal position on the concavely curved delivery table 52 before the member entering the coating position can reach the stop provided.

From the foregoing description it should be apparent that successive ones of the members from the train of members to be coated are intermittently advanced into position between the coating stencil screens generally shown at 51, where they are momentarily rested to permit the application of a coating through the stencil screens to their opposite face surfaces.

Referring now to Figs. 3–7 of the drawings, the details of the stencil screen coating portion of the machine will now be described. The lacquer-like coating must be applied through the two spaced apart screens 184 and 185, with the latter snugly applied to the two respective sides of a member 20. Likewise, a member 20 must be very precisely centered between the screens so that the stencil pattern on each screen is applied to the respective sides of the member 20 in the exact predetermined position. Because the members 20 may vary slightly in transverse thickness and it is desired to provide the maximum practical tolerance to handle such variations an expandable support is provided. This includes an upper pair of spring plates 180—181, and a lower pair of spring plates 182—183 supported in alignment with the path of movement of the members to be coated, and provide side walls for guiding the member 20 into coating position between the stencil screens 184 and 185. As more clearly shown in the cutaway portion in the lower half of Fig. 7, the spring plate 182 is provided with a plurality of track supports such as shown at 186 and 187, while the spring plate 183 is also provided with a plurality of track supports such as shown at 188 and 189. Similarly the upper pair of spring plates 180, 181, are also provided with track supports such as shown at 190 and 191, respectively (Figs. 4, 3a, and 6a). The plurality of track supports such as those shown at 186 to 191 inclusive support the member 20 in its path of movement between the stencil screens 184 and 185. Each pair of plates, 180—181, and 182—183 can be expanded relative to one another by springs S and S' (Figs. 3a, 6 and 6a) between the pairs and at each end thereof. The position of the upper pair of spring plates 180, 181 may be spaced relative to the lower pair of spring plates 182, 183, by means of the adjusting screws 192, 193 and hand wheels 194, 195, and such position is adjusted to slightly more than the width of the member 20 to be coated.

Fig. 3a, and to a lesser degree Fig. 6a, clearly illustrate how the projections or track supports as 190 and 191, alternate and are interleaved with one another.

After a member to be coated is received in coating position between the stencil screens 184, 185, and registered or aligned by stop dogs 202 and 203 and fingers 211 and 212, air under pressure may be supplied to a plurality of air cylinders such as shown at 196—198 to move the spring plates 180 and 182, respectively, towards the spring plates 181 and 183, to clamp the member 20 in the coating position therebetween. Fig. 13 of the drawings is a fragmentary detail showing the piston 199 of the air cylinder 196 which operates through the piston rod 200 to clamp the spring plate 180 against the spring plate 181 when air pressure is supplied thereto.

Figure 7:
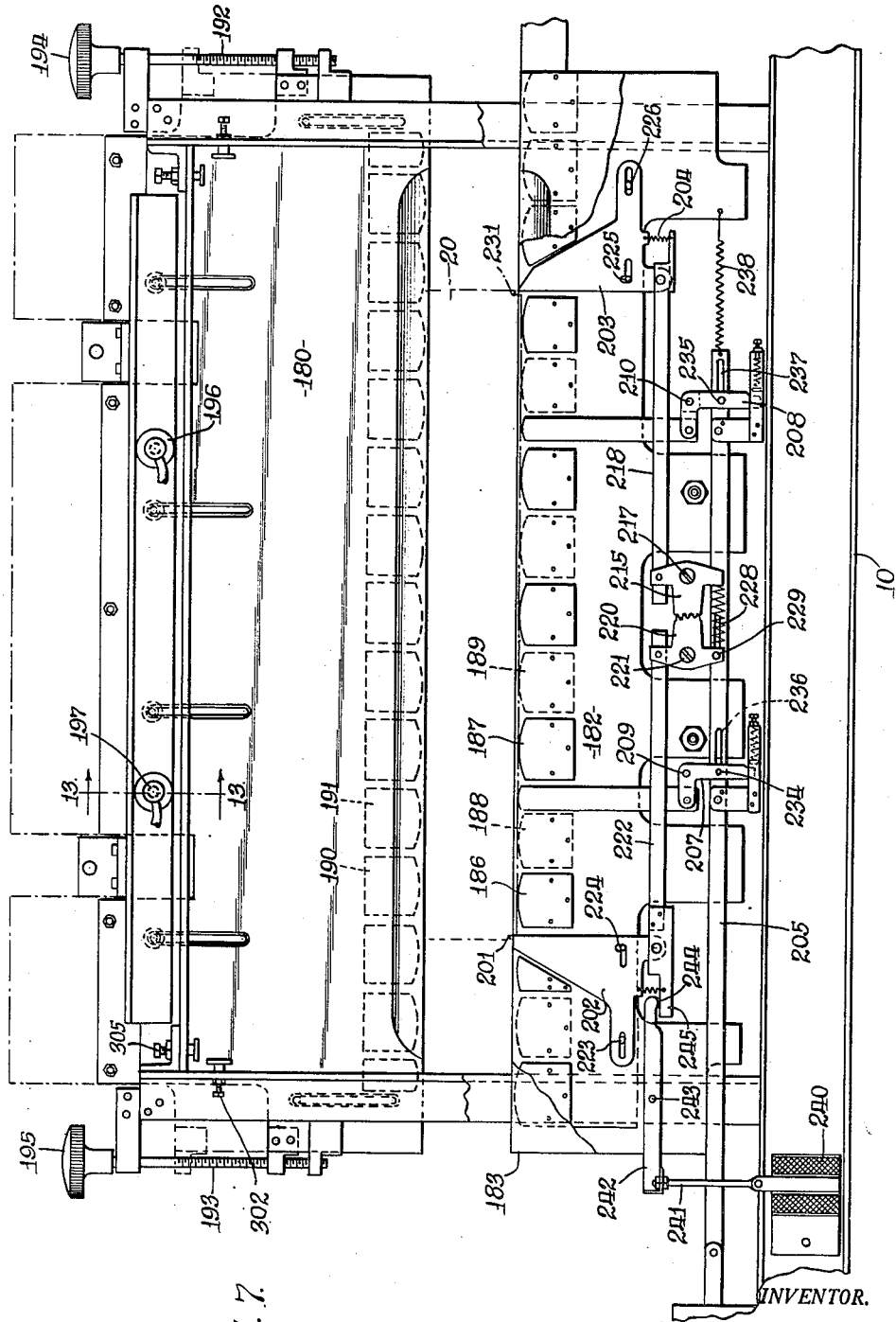
Fig. 7 is a section generally on the line 7—7 of Fig. 6.

With particular reference to Figs. 4, 5 and 7 of the drawings, the advancing member to be coated as generally indicated at 20 passes along the track supports 186—191 until the advancing side edge 201 is engaged with the pivoted stop member 202. The advancing member 20 rides over the pivoted stop dog 203 as shown in Fig. 4 of the drawings, and when the member 20 engages the pivoted stop dog 202, as shown in Fig. 5 of the drawings, the pivoted stop dog 203 springs back into the position shown in response to the tension of the coil spring 204. Thereafter the lever arm 205 may be moved to the left of the drawing upon energization of the strip positioning solenoid 206 by the control circuit to be described later in detail. The movement of the lever arm 205 to the left causes the bell cranks 207, 208 to rock about their pivots 209, 210 in a clockwise direction and move the positioning fingers 211 and 212 upwards to seat the member 20 to be coated against the upper track supports 190 and 191. At the same time the sector gear 220 which is pivotally connected at 229 to the lever arm 205 is pivoted about its pivot point 221 in a clockwise direction to move the connecting arm 222 to the right of the drawing. The sector gear 215 meshes with sector gear 220 to rock such gear about its pivot 217 in the counter-clockwise direction to move the connecting arm 218 to the left of the drawing. The simultaneous movement of the connecting arms 218 and 222 in the opposite directions toward each other, causes the pivotal dog members 202 and 203 to slide on their pins 223, 224 and 225, 226, respectively, and move toward each other to contact the end corners 201 and 231 of the member 20 to be coated. Thus the member 20 is centered in the desired predetermined position with respect to the stencil screens 184 and 185. It will be noted that the sector gear 220 is connected at 229 in the slot 228 of the lever arm 205, and that a coil spring 227 is provided to facilitate the desired pivotal movements of both the sector gears 215 and 220. It will also be noted that the bell cranks 207 and 208 are connected to be operated by the lever arm 205 through the compression coil springs 232, 233, and that the lever arm 205 is supported on the bell cranks 207 and 208 by means of the pivots 234 and 235 engaging the slots 236 and 237 of the lever arm 205. The tension coil spring 238 serves to return the lever arm 205 to the normal position shown in Fig. 4 of the drawings when the strip member positioning solenoid 206 is de-energized. The entire arrangement of springs, pivots and levers is such as to assure a floating action which will enable the accurate positioning of the members to be coated even though such members to be coated may vary slightly in actual length.

After the member 20 has been coated, the strip positioning solenoid 206 is de-energized and the dog release solenoid 240 is energized. The solenoid 240 when energized moves the connecting arm 241 upward to rock the lever 242 pivoted at 243 in the clockwise direction. The movement of the lever 242 in a clockwise direction causes the lever end 244 to engage the end 245 of the connecting arm 222 and pull the pivoted stop dog 202 downward out of engagement with the end 201 of the member 20. Thereafter the member 20 may be moved from between the stencil screens 184, 185 by the entrance of a subsequent member to be coated.

Referring now more particularly to Figs. 3 and 6 of the drawings, the squeegee mechanism for applying a coating through the stencil screens 184 and 185 will now be described. In Fig. 3 of the drawings, the squeegee mechanism is shown at the upper limit of its travel after applying the coating to the stencil screen, while in Fig. 6 of the drawing, the squeegee mechanisms are shown in their lower rest positions prior to applying a coating to the stencil screen. A pair of air cylinders 250, 251 is supported from the main frame rail 10 as shown. The piston rods 252, 253 are connected to a cross arm 254 which is pivotally connected at 255, 256 to the operating arms 257, 258 for squeegee mechanisms on opposite sides of the stencil screens 184, 185, respectively. A squeegee blade 260 of rubber or other suitable flexible material is pivoted at 261 to a cross slide arm 262. The other end of the squeegee blade 261 is pivoted at 263 to the cross slide arm 264 (Fig. 2c and Fig. 3 of the drawings). Springs such as shown at 265 are provided to maintain the squeegee blade 260 in a desired position as shown and as limited by the setting of set screws such as the set screw 266. Similarly the squeegee blade 270 is pivoted at 271 to the cross slide arm 272 for cooperation with the opposite face stencil screen 185. It should be understood that the arrangements for movably supporting the squeegee blades 260 and 270 are identical, and therefore additional description of the squeegee blade 270 is not required.

The cross slides such as shown at 262 and 272 are slidably supported in journals 273 and 274. The journals 273 and 274 are vertically slidable along the guide rods 275 and 276. Each of the connecting arms 257—258, are pivotally connected by a respective connecting arm, such as shown at 280, to the journal supports such as shown at 273 and 281. When air pressure is supplied to the air cylinders 250, 251 in a manner to move the connecting arms 257, 258 upwardly to the position shown in Fig. 3 of the drawings, the squeegee wiper blades 260 and 270 are dragged across the surface of the stencil screens 184, 185, and push each of the respective stencil screens against the opposite face surfaces of the member 20 to be coated. A coating of lacquer or other coating material to be applied is retained on the upper surfaces of the squeegee blades 260, 270, and when the blades move across the stencil screens 184, 185, such coating material is forced through the screens in the open portions thereof, as defined by the stencil design, onto the opposite face surfaces of the member to be coated.

In order to move the squeegee blades 260, 270 towards the stencil screens 184, 185, respectively, as such blades are moved upwardly across the stencil screens, the cam rollers such as shown at 282, 283 on the ends of the cross slide arms 262, 272, respectively, are provided. In the upward movement of the cross slide arms 262, 272, the rollers 282, 283 engage the pivoted cam surfaces such as shown at 284, 285, to move the cross slides 262, 272 towards the stencil screens 184, 185. As the squeegee blades 260, 270, and the cross slide arms 262, 272 reach the upper limit of their travel, the rollers 282, 283 engage the cam surfaces 286, 287 and move the cross slides 262, 272 outward away from the stencil screens. Thereafter, upon applying air pressure to the cylinders 250, 251 in the direction to move the connecting arms 257, 258 downward, the rollers 282, 283 engage the back surfaces 290, 291 of the pivoted cam members 284, 285. Thus in such manner as the squeegee blades 260, 270 are moved downwards to return to the rest positions shown in Fig. 6 of the drawings, the blades are maintained out of contact with the stencil screens 184, 185. As the cross slide arms 262, 272 return to their lower limits of travel the rollers 282, 283 engage the cam surfaces 292, 293 and pass between the ends of the pivoted cam members 284, 285, to move the cross slides 262, 272 inwards to the lower rest positions with the squeegee blades 260, 270 just contacting the stencil screens 184, 185. The flat leaf springs 294, 295 return the pivoted cam surfaces 284, 285 to their normal positions as shown in Fig. 6 of the drawing after the cross slide arms 262, 272 have reached their lower limit of travel. It should be understood that the cam mechanisms as described above for operating the inward and outward movement of the squeegee blades 260, 270 as the blades are reciprocated across the stencil screen surfaces is duplicated for all four cross slide arms, one at each end of each of the squeegee blades 260, 270, respectively. Each of the stencil screens 184, 185 is fastened to a framework 300, 301, which is secured in the desired alignment within the machine framework by means of the threaded adjusting screws such as shown at 302, 303, 304, etc.

Figure 14:
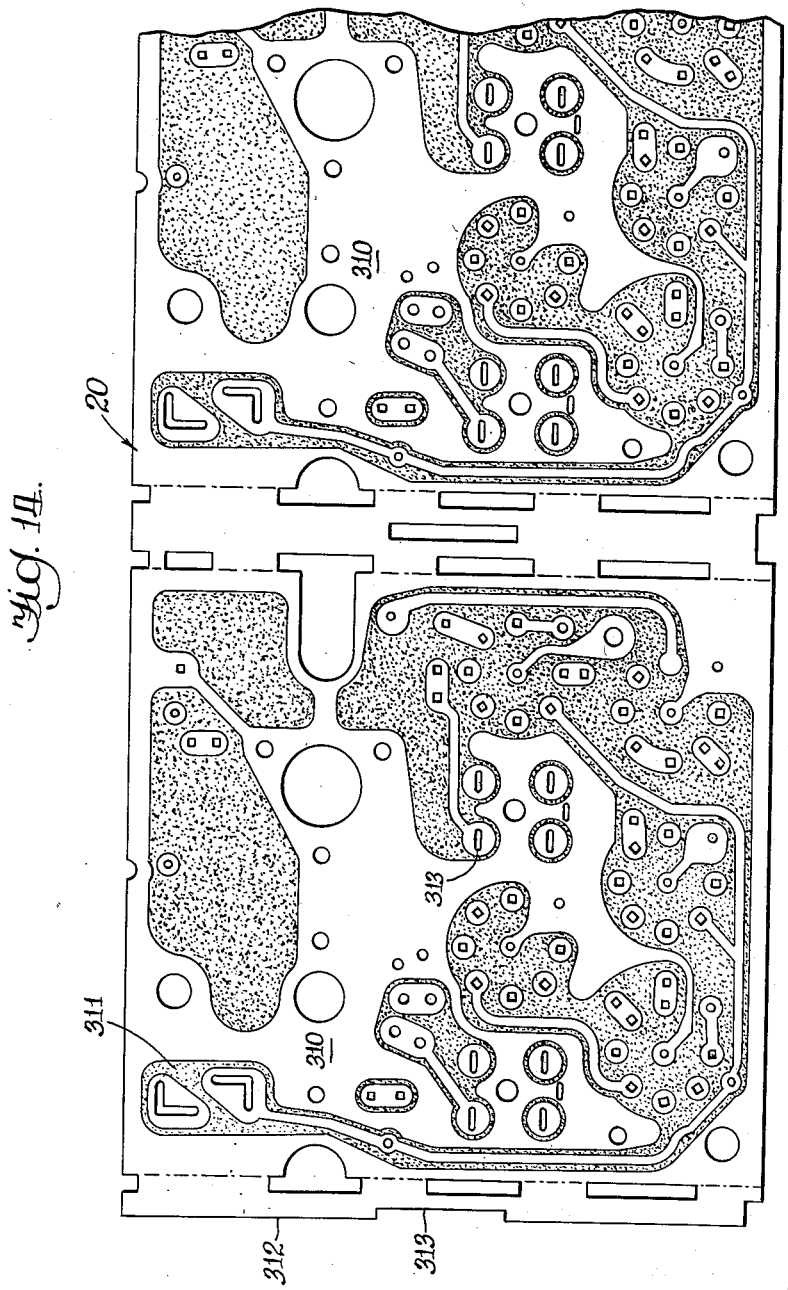
Fig. 14 is a fragmentary elevation of a printed circuit chassis sheet coated by the machine of the invention.

Fig. 14 of the drawings shows a portion of a member 20 which may be coated by the machine of the invention. When the member 20 is to be used as a printed circuit radio chassis, such member may be formed of a sheet of insulating material such as a laminated plastic sheet or strip. The laminated plastic strip when passing through the metal coating cabinet 30 may be coated on all exposed surfaces with a metal coating preferably of silver, when silver salt solutions and silver salt reducing solutions are supplied to the coating spray guns.

Thereafter, when the member 20 is positioned between the stencil screens 184, 185, a second, or overlying coating of lacquer or other insulating varnish-like material is applied through the stencil design of the stencil screens. This coating of lacquer or other material produces the variegated designs of coating 311 on opposite face surfaces of the member 20 (Fig. 14). The stippled areas 311 represent the coating of lacquer, while the non-stippled, or simply plain, areas on the drawing and indicated by 310, represent the underlying metal or silver coating free of the overlying lacquer, depending upon the nature of the design on the stencil coating screen. In other words, the coating 311 of lacquer or other similar material applied through the stencil obscures the silver coating, while in other areas 310 the metal coating is exposed on the sheet. Also in connection with Fig. 14 of the drawings, it will be noted that each end side edge such as the side edge 312 of the member 20 is provided with a central notch 313. The central notch 313 at the end side portions of each member to be coated provides an overlapping or interlocked connection between successive ones of such members while tilted criss-cross in a train of members to be pushed through the various coating and treating cabinets of the machine. Such notched or interlocked connection between successive ones of the members in the train of members to be pushed through the machine, is clearly shown at 314, Fig. 2b of the drawings.

Referring to Fig. 15 of the drawings, the automatic operation of the machine will now be described together with the description of an automatic control circuit therefor. One terminal 320 of 110 volt A. C. line is connected to the line 321, while the other terminal 322 of the 110 volt A. C. line is connected through the overload release or circuit breaker switch 323 to line 324. The switch panel 325 is positioned at the stencil screen coating end of the machine and serves to control the operation of such portion of the machine. The switch panel 326 is positioned near the magazine feed, train forming and driving portion of the machine. The switches 327 and 328 control the energization of the main drive motor 18 in a manner such that the motor 18 may be energized or de-energized by the operation of either switch 327 or 328 at either switch panel 325, 326, respectively. A motor reversing switch 329 is wired in circuit with the main drive motor 18 to enable such motor to be reversed at times when it is necessary to reverse the direction of movement of the driven ones of the train of members prior to the entrance of the train members into the sandblast cabinet 25. The lefthand feed motor 71 and the righthand feed motor 74 are connected by lines 330 and 331 to line 321 and the terminal 320 of the 110 volt A. C. input. When it is desired to start the feed of members to be coated from the magazines 11 and 12 the normally open switch 332 may be momentarily closed to establish a circuit through the main feed control switch 333, line 334, 335, and transfer switch 336 to line 337, and the lefthand feed motor 71. The switch 332 is normally located to be contacted by a member to be coated advancing in the lefthand feed groove 62 of the conveyor belt 14 after such member to be coated has cleared the end of the magazine hopper so that a subsequent member may be moved onto the conveyor surface groove 61. Similarly, the normally open switch 338 is positioned to be contacted when a member to be coated is received in the conveyor groove 61 and advanced beyond the magazine hopper.

The momentary closing of switch 332 which may be done manually at the start of the machine operation causes the feed motor 71 to be energized as previously described, which moves the cam roller 80 to the position to move the switch arm 81 from the normally open position to the closed position, and establishes a holding circuit through lines 340 and 334 for the feed motor 71. Cams 80 and 82, and switches 81 and 83, are diagrammatic representations of the like numbered rollers and switches of Fig. 12, functioning in equivalent manner. At the same time that the feed motor 71 is energized to feed a member to be coated from the container 11 into the conveyor groove 61, the solenoid 341, is energized by closing of switch 81 to move the transfer switch arm 336 to the dotted line position. The transfer switch arm 336 is arranged to remain in the position to which it has been moved upon energization of either the solenoids 341 or 342 even after such solenoids are subsequently de-energized. After a member to be coated has been fed from the magazine 11 into the conveyor groove 61, the cam 80 again reaches the position shown in Figs. 12 and 15 of the drawings to move the switch arm 81 to the normally open position and thereby deenergize the lefthand feed motor 71 and the transfer switch solenoid 341.

The member to be coated fed from the magazine 11 and received in the groove 61 of the conveyor belt 14 is moved by the belt 14 towards the first grooved drive pulley 102, and as it moves into a position clearing the lefthand end of the magazines 11 and 12, the switch 338 is engaged by the upper surface of the member to be coated to close the switch 338 and energize the righthand feed motor 74. The momentary energization of the feed motor 74 moves the cam roller 82 into position to close normally open switch 83 and energize the transfer switch solenoid 342 and establish a holding circuit for the feed motor 74. The energization of transfer relay 342 moves the transfer switch arm 336 back to the solid line position and conditions a circuit for enabling the switch 332 to energize the left feed motor 71 upon engagement by a subsequent member to be coated. It should be apparent that the operation of the switches 332, 338 and the transfer switch 336, is effective to assure that the feed motors 71 and 74 will be alternately energized in a manner to feed successive members to be coated onto opposite conveying grooves 61, 62, respectively. The train of members to be coated as thus formed is fed by the grooved driving rollers 93, 99—102 into the sandblast cabinet 25, and the subsequent treating and coating cabinets 26—31.

The members are brought forth from the magazines only by the demand of preceding members, thus assuring alternately fed members without dependence upon timing.

The high-speed drive roller 169 is driven by the electric motor 170 which is connected to the lines 321 and 324 through the control switch 345 of the switch panel 325. Similarly the high-speed drive roller motor 350 for driving the ejecting drive roller 175 is also connected to lines 321 and 324 by means of the control switch 345. The leading member in the train of members to be coated after passing from the final air blast cabinet 31, is received in the single track groove 168 and is advanced by the high speed drive roller 169 and detached from the following train of members. The main control switch 351 is provided on the switch panel 325 to control the supply of electrical energy to the stencil coating control circuits.

In describing the operation of the stencil coating control circuits, it should be mentioned that the member to be coated when engaging the high speed drive roller 169 is advanced to drive a preceding member on track 168 into coating position between the stencil screen, which member also advances a preceding coated member from the position between the stencil screen onto the ejecting drive roller 175 which drives such coated member at high speed toward the end of the track and the horizontal delivery table. The advancement of a member to a rest position beyond the high speed drive roller 169 which also advances a preceding member into position between the stencil screens, momentarily opens the normally closed switch contacts 352 to de-energize the strip positioning solenoid 206. Assuming the dog release solenoid 240 to be previously energized in a manner to be later described and during the passage of a just coated member over the pivoted dog 202 to the delivery table by means of the drive roller 175, the passage of such member until it is clear of the pivoted dog 202, opens the normally closed switch contacts 353 to break the holding circuit of the dog release solenoid 240 and also prevent energization of the strip positioning solenoid 226. Thereafter the normally closed switch contacts 353 return to their closed position and a circuit is established from line 324 through switch 351, line 354, switch contacts 353, line 355 through switch contacts 356, line 357 and switch contacts 352 to energize the strip positioning solenoid 206 connected to line 321. The energization of the strip positioning solenoid 206 moves the lever arm 205 (Figs. 4 and 5 of the drawings) to the left, and positions the member to be coated in the correct alignment with stencilled screens. The energization of the strip positioning solenoid 206, also closes the switch contacts 358 to energize solenoid valve 359 to supply air under pressure from the air line 360 to air lines 361 and 362 for supplying air pressure to the clamping cylinders 196—198 and the air cylinders 250, 251 in a manner to move the squeegee blades 260, 271 upwards against the stencil screens 184, 185, respectively. As the squeegee blades 260, 270 reach their upper limit of travel the switch arm 365 is engaged and moved to establish a connection with contacts 366 and 367. The connection between the switch arm 365 and contact 366 energizes the solenoid valve 368 for supplying air under pressure to the air cylinders 250, 251, in a manner to again lower the squeegee blades 260, 270. It will be noted that the air solenoid valves 359 and 368 are connected together so that the energization of one solenoid valve to open its associated valve moves the other solenoid valve to the closed position and vice versa and that the valves remain in their last moved positions even after either of the solenoids 359, 368 are de-energized. At the same time when the squeegee blades are at their upper limit of travel the connection between the switch arm 365 and contact 367 energizes the pivoted dog release solenoid 240 in a manner to pivot the dog release arm 242 in a clockwise direction for moving the pivotal dog 202 out of the path of the member that has just been coated by the upward movement of the squeegee arms 260, 270. The energization of the dog release solenoid 240 also moves the switch arm 356 to the dotted line position which establishes a holding circuit for the dog release solenoid, which remains energized even after the switch arm 365 moves to the normally open position as the squeegee blades are lowered out of contact therewith and until the holding circuit is broken by the opening of switch contacts 353 as previously described.

The timed speeds of the main drive motor 18 and the speed-up motor 170 are such that by the time the squeegee blades 260, 270 are returning to the lower position and the dog release solenoid 240 is energized, a subsequent member to be coated has been advanced into contact with the high speed drive roller 169 which thereafter advances such panel to advance the preceding member to be coated into engagement with the member just coated and opening the normally closed switch contact 352. The movement of the switch arm 356 from the solid line position to the dotted line position upon energization of the dog release solenoid, also interrupts the circuit in line 357 to de-energize the strip positioning solenoid and the up solenoid valve 359. Therefore after the squeegee blades 260, 270 have reached their upper limit of travel and the dog release solenoid 240 is energized, it is apparent that the air gripping cylinders 196—198 are released and the strip member positioning relay lever arm 205 is returned to the normal righthand position shown in Fig. 4 of the drawings by means of the spring.

It is believed that the operation of the invention as described above in connection with the description of the control circuit for the automatic operation of the machine should now be readily apparent. The exact location of the various strip member position responsive switches, such as the switches 352, 353, 332 and 338 have not been specifically shown in the drawings, but it will be understood that their positions are predetermined in accordance with the size and shape of the strip members to be coated. While the machine has been described in connection with a preferred use for coating an elongated strip of insulating material with a first underlying metal coating, and a second overlying lacquer or varnish coating of variegated design, it should be understood that the machine is not limited to such use. It shoud also be understood that the novel arrangement of stencil screens and squeegee arms for simultaneously coating both face sides of a sheet-like member positioned between the screens in a generally vertical plane, is not limited to use with a continuously moving train of members to be coated, and that such arrangement may be readily used for coating or printing a variegated coating design on opposite face sides of any sheet-like member to be positioned between the stencil screen.

Various modifications may be made within the spirit of the invention and the scope of the appended claims.

I claim:

1. A machine for simultaneously coating both sides of each of a plurality of sheet-like members with a coating of variegated design including in combination, housing means, means to continuously form and push a successive butt connected train of said members to be treated through said housing means with successive members in planes oppositely inclined to a vertical plane, means within the housing means to treat all exposed surfaces of each of said members as said members pass through said housing means, a pair of stencil screens mounted in spaced vertical planes opposite to each other, means to intermittently advance successive ones of each of said members from the train which has moved through said housing means to a position of rest between said stencil screens and at the same time eject a previously treated member from the position of rest, means to grip and align each member in the rest position in predetermined relation to said screens, and means operable to simultaneously apply a coating through each of said screens on opposite sides of each of said members during the interval when the member is gripped and aligned in the rest position between the stencil screens.

2. A machine for simultaneously coating in succession both sides of each of a plurality of sheet-like members with a first underlying coating on all exposed surfaces and with an upper coating of variegated design on opposite face sides including in combination, housing means, means to continuously form and push a train of said members to be coated through said housing means with successive members abutting one another in planes oppositely inclined to a vertical plane, means within the housing means to apply said first underlying coating to all exposed surfaces of each of said members as said members pass through said housing means, a pair of stencil screens mounted in spaced vertical planes opposite to each other, means to intermittently advance successive ones of each of said members from the train of members pushed through said housing means to a position of rest between said stencil screens and at the same time eject a previously coated member from the position of rest due to the butt connection of said previously coated member and said advancing member, means to grip and align each member in the rest position in predetermined relation to said screens, means operable to simultaneously apply a coating through each of said screens on opposite sides of each of said members during the interval when the member is gripped and aligned in the rest position between the stencil screens, and means to release said gripping means after the operation of said coating means through said screens, said means to intermittently advance successive ones of said members being timed to be operative with the release of said gripping means.

3. A machine for simultaneously coating in succession both sides of each of a plurality of sheet-like members with a first underlying coating on all exposed surfaces and with an upper coating of variegated design on opposite face sides including in combination, at least one coating station, means to continuously form and move in butt connection a train of sheet-like members through said coating station with successive members abutting one another in planes oppositely inclined to a vertical plane, a plurality of discontinuous longitudinally spaced track supports adjacent said station for guiding the movement of said train of members through said coating station, means at the station to apply a first underlying coating to all exposed surfaces of each of said members as said members span said track supports and pass through said coating station, track means to exactly vertically align each of said members after said members have passed through said coating station, a pair of stencil screens mounted in spaced vertical planes opposite to each other, means to intermittently advance successive ones of each of said vertically aligned members from said train of members on said track means to a position of rest between said stencil screens and at the same time eject a previously coated member from the coating position due to the butt connection of said previously coated member and said advancing member on said track means, means to grip and align each member in the rest position in predetermined relation to said screens, and reciprocating means operable to simultaneously apply a coating through each of said screens on opposite sides of each of said members during the interval when the member is gripped in the aligned rest position between said screens.

4. A machine for simultaneously coating in succession both sides of each of a plurality of sheet-like members with a first underlying coating on all exposed surfaces and with an upper coating of variegated design on opposite face sides including in combination, at least one treating station, means to continuously form in butt connection and move a train of sheet-like members through said station with successive members abutting one another in planes oppositely inclined to a vertical plane, a plurality of discontinuous longitudinally spaced track supports adjacent said station for guiding the movement of said train of members through said treating station, means at the treating station to apply a first underlying coating to all exposed surfaces of each of said members as said members span said track supports and pass through said station, track means to exactly vertically align each of said members after said members have passed through said station, a pair of stencil screens mounted in spaced vertical planes opposite to each other, means to intermittently advance successive ones of each of said vertically aligned members from said train of members on said track means to a position of rest between said stencil screens and at the same time eject a previously coated member from the rest position between the screens due to the butt connection of said previously coated member and said advancing member on said track means, means to grip and align each member in the rest position in predetermined relation to said screens, reciprocating means operable to simultaneously apply a coating through each of said screens on opposite sides of each of said members during the interval when the member is gripped in the aligned rest position between said screens, and means to release said gripping means after the operation of said coating means through said screens, said means to intermittently advance successive ones of said members being timed to be operative with the release of said gripping means.

5. A machine for simultaneously coating in continuous succession all exposed surfaces of each of a plurality of sheet-like members formed of relatively stiff material including in combination, housing means, means positioned externally of said housing means to continuously push a train of sheet-like members with successive members abutting one another in planes oppositely inclined to a vertical plane through said housing means, a plurality of discontinuous double-grooved track supports longitudinally positioned within said housing means and above and below the members to engage in alternate grooves the edges of successive ones of the sheet-like members so as to guide the train of successive members through said housing means and maintain the members in their aforesaid inclined positions, and a plurality of coating nozzles positioned on both sides of the path of movement of said members through said housing means and positioned to span between said track supports with a spray so as to spray-coat all exposed surfaces of the members as the members are pushed through said housing means.

6. A machine for simultaneously coating in continuous succession all exposed surfaces of each of a plurality of sheet like members formed of relatively stiff material including in combination, a housing, a pair of magazines adapted to contain a plurality of members to be coated, a continuously moving conveyor, means to feed successive members from alternate ones of said magazines to said conveyor, the member fed from one magazine being tilted from the vertical in one direction and the member fed from the other magazine being tilted from the vertical in the opposite direction whereby a crossed push connection for successive ones of a train of members on said conveyor is formed, drive pulley means positioned externally of said housing for engaging at least one edge of the members to continuously push the train of sheet-like members from said conveyor through said housing, a plurality of discontinuous track supports longitudinally positioned within said housing and adapted to guide the train of successive members through said housing, and a plurality of coating nozzles positioned on both sides of the path of movement of said members through said housing and adapted to spray coat all exposed surfaces of said members as said members are pushed through said housing.

7. A machine for applying a metal coating in continuous succession to all exposed surfaces of each of a plurality of sheet-like members formed of relatively stiff non-metallic material including in combination, first means to form and longitudinally move a train of such members with successive members tilted in opposite directions to the vertical to thereby establish a push driving connection between successive members in the train of members thus formed, a plurality of discontinuous track members to guide the train of sheet-like members moved by said first means for extended longitudinal movement, a first cabinet surrounding the path of movement of such train from said first means, means within said first cabinet to roughen all exposed surfaces of the train of members moving therethrough, a second cabinet surrounding the path of movement of said train from said first cabinet, means within said second cabinet to coat a preliminary metal sensitizing fluid on all exposed surfaces of the train of members moving therethrough, a third cabinet surrounding the path of movement of the train of members from said second cabinet, and means within said third cabinet to apply a coating of metal on all exposed surfaces of said train of members moving therethrough.

8. A machine for applying a metal coating in continuous succession to all exposed surfaces of each of a plurality of sheet-like members formed of relatively stiff non-metallic material including in combination, first means to form and longitudinally move a train of said members with successive members tilted in opposite directions to the vertical to thereby establish a push driving connection between successive members in the train of members thus formed, a plurality of discontinuous track members to guide the train of members moved by said first means for extended longitudinal movement, a first cabinet surrounding the path of movement of said train from said first means, sandblast means within said first cabinet to roughen all exposed surfaces of said train of members moving therethrough, a second cabinet surrounding the path of movement of said train from said first cabinet, means within said second cabinet to coat a preliminary metal sensitizing fluid on all exposed surfaces of said train of members moving therethrough, a third cabinet surrounding the path of movement of said train from said second cabinet, and means within said third cabinet to simultaneously spray a metal salt solution and a metal salt reducing solution on all exposed surfaces of said train of members moving therethrough to thereby form a metal coating on said members.

9. A machine for applying a metal coating in continuous succession to all exposed surfaces of a plurality of sheet-like members formed of relatively stiff non-metallic material including in combination, means including a conveyor belt to form and longitudinally move a train of said members at a selected speed with successive members tilted in opposite directions to the vertical to thereby establish a push driving connection between successive members in the train of members thus formed, a plurality of discontinuous track members to guide the movement of said train of members for an extended longitudinal movement, drive pulley means to push said train of members along said track members, said drive pulley means being operative to push said train of members at less speed than the speed of movement of said train by said first mentioned means, a first cabinet surrounding the path of movement of said train from said drive pulley means, sand blast means within said first cabinet to roughen all exposed surfaces of said train of members moving therethrough, rinse means surrounding the path of movement of said train from said first cabinet to apply a rinse liquid and remove sand from the surface of said members, drying means surrounding the path of movement of said train from said rinse means, a second cabinet surrounding the path of movement of said train from said first drying means, means within said second cabinet to coat a preliminary metal sensitizing fluid on all exposed surfaces of said train of members moving therethrough, second drying means surrounding the path of movement of said train from said second cabinet, a third cabinet surrounding the path of movement of said train from said second drying means, means within said third cabinet to simultaneously spray a metal salt solution and a metal salt reducing solution on all exposed surfaces of said train of members moving therethrough to thereby form a metal coating on said members, and third drying means surrounding the path of movement of said train from said third cabinet.

10. A machine for applying a silver coating in continuous succession to all exposed surfaces of a plurality of plastic sheet-like members including in combination, means including a double grooved conveyor belt to form and longitudinally move a train of said members at a selected speed with successive members tilted in opposite directions to the vertical to thereby establish a push driving connection between successive members in the train of members thus formed, a plurality of discontinuous track members to guide the movement of said train of members for an extended longitudinal movement, double grooved drive pulley means to push said train of members along said track members, said drive pulley means being operative to push said train of members at less speed than the speed of movement of said train by said first mentioned means, a first cabinet surrounding the path of movement of said train from said driving means, sand blast means within said first cabinet to roughen all exposed surfaces of said train of members moving therethrough, rinse means surrounding the path of movement of said train from said first cabinet to apply a rinse liquid and remove sand from the surface of said members, drying means surrounding the path of movement of said train from said rinse means, a second cabinet surrounding the path of movement of said train from said first drying means, means within said second cabinet to coat a preliminary metal sensitizing fluid on all exposed surfaces of said train of members moving therethrough, second drying means surrounding the path of movement of said train from said second cabinet, a third cabinet surrounding the path of movement of said train from said second drying means, means within said third cabinet to simultaneously spray a silver salt solution and a silver salt reducing solution on all exposed surfaces of said train of members moving therethrough to thereby form a silver coating on said members, and third drying means surrounding the path of movement of said train from said third cabinet.

11. In a machine for simultaneously coating all exposed surfaces of successive ones of a plurality of sheet-like members, the means for longitudinally moving a train of said members including in combination, a longitudinally moving conveyor belt having a longitudinally extending dividing ridge on its conveying surface, a pair of magazines adapted to contain a plurality of stacked members to be coated, each of said magazines being positioned at opposite sides respectively of said longitudinally moving conveyor belt, means to alternately feed successive members from first one and then the other of said magazines into successive positions on said conveyor belt, means to position the respective member fed from each magazine on respective opposite sides of the dividing ridge of said conveyor belt whereby successive ones of said members are tilted in opposite directions to the vertical to provide abutting connections between members for moving the train of members formed thereby in the direction of conveyor movement, second driving means positioned to receive the train of members moved by said conveyor belt, said second driving means being operative to push said train of members at less speed than the speed of movement of said belt whereby a positive pushing connection is obtained between the abutting ends of said members, a plurality of longitudinally positioned discontinuous track supporting members to guide the longitudinal path of movement of said train of members to be coated, said track members being adapted to maintain the tilted positions of said members to be coated during their longitudinal movement thereon, and coating means positioned along the path of movement of said train of members on opposite sides of said members for coating all exposed surfaces of said members as said members move and span the spaces between the discontinuous track supporting members.

12. In a machine for coating all exposed surfaces of successive ones of a plurality of sheet-like members with a plurality of successive coatings, the means for longitudinally moving through the machine a train of said members including in combination, a longitudinally moving conveyor belt having a longitudinally extending dividing ridge on its conveying surface, a pair of magazines positioned at opposite sides respectively of said longitudinally moving conveyor belt and each magazine adapted to carry a plurality of stacked members, means to alternately feed successive members from first one and then the other of said magazines into successive positions on said conveyor belt, means to position the respective members fed from each magazine on respective opposite sides of the dividing ridge of said conveyor belt whereby successive ones of said members are tilted in opposite directions to the vertical and are in abutting connection one to another to permit pushing the train of members formed thereby in the direction of conveyor movement, a second driving means positioned to receive the train of members pushed by said conveyor belt, said second driving means being operative to move said train of members at less speed than the speed of movement of said belt whereby a positive pushing connection is obtained between the abutting ends of said members, a plurality of longitudinally positioned discontinuous track supporting members to guide the longitudinal path of movement of said train of members to be coated, said track members being adapted to maintain the tilted positions of said members to be coated during their longitudinal movement, coating means positioned along the path of movement of said train of members on opposite sides of the members for coating all exposed surfaces of said members with an underlying coating as said members move and span the spaces between the discontinuous track supporting members, second track means positioned to receive said train of members moving from said discontinuous track members, said second track means being adapted to support each of said members in said train of members in aligned vertical positions, coating means to simultaneously apply an overlying coating of variegated design to both sides of said members while said members are supported by said second track means, and means for separating the leading members in said second track means from said train and for directing each separated member toward said coating means at a relatively high speed as compared with the speed of the members on said second track means, whereby each separated member moves a preceding member into said coating means and each preceding member ejects a next preceding member from said coating means.

13. A machine for simultaneously applying a coating of variegated design on opposite sides of successive ones of a plurality of sheet-like members including in combination, a track, first means for longitudinally pushing along said track a train of said members to be coated with said members positioned in a vertical plane and with the ends of successive members abutting each other to provide a push connection for said train, a pair of coating stencil screens of variegated design, each of said screens being mounted in a vertical plane in oppositely spaced positions, said track passing between said screens, second means positioned in the path of movement of said train for engaging and moving successive ones of said members from said first means along said track into a coating position in the space between said screens, said second means being operative to move each of said members in engagement therewith at higher speed than the speed of movement of said first means whereby each member moved by said second means is disengaged from said train of members, the member moved by said second means abutting a previously moved and coated member in position between said screens to eject said previously coated member, coating means movable simultaneously adjacent the sides of said screens to apply a coating through said screens on opposite sides of a member positioned therebetween, and means to move said coating means during the interval when a member is positioned between the screens and prior to its ejection by the subsequent movement of a member by said second moving means.

14. A machine for simultaneously applying a coating of variegated design on opposite sides of successive ones of a plurality of sheet-like members including in combination, a track, first means for longitudinally pushing along said track a train of said members to be coated with said members positioned in a vertical plane and with the ends of successive members abutting each other to provide the push connection for said train, a pair of coating stencil screens of variegated design, with each of said screens being mounted in a vertical plane in oppositely spaced positions and with said track passing therebetween, second means positioned in the path of movement of said train for engaging and moving successive ones of said members from said first means along said track into a coating position in the space between said screens, said second means being operative to move each of said members in engagement therewith at higher speed than the speed of movement of said first means whereby each member moved by said second means is disengaged from said train of members, the member moved by said second means abutting a previously moved member in position between said screens to eject said previously moved member, means to grip and position a member received between said screens in a predetermined relation to said screens, a pair of squeegee coating means adapted to be simultaneously reciprocated, one of said coating means being positioned adjacent one of said screens and the other of said coating means being positioned adjacent the other of said screens, means to reciprocate both of said coating means during the interval when a member is gripped in position between the screens, means operable to move said coating means into contact with said screens during one direction of reciprocation and to move said coating means out of contact with said screens during the opposite direction of reciprocation, and means to release said gripping means after a reciprocation of said coating means, said second member moving means being operated in timed relation with the release of said gripping means to eject a coated member by the movement of a subsequent member into position between said screens.

15. In a machine for simultaneously coating all exposed surfaces of successive ones of a plurality of sheet-like members, said sheet-like members each having a central notched portion at each end thereof, including in combination, moving conveyor means, a pair of magazines adapted to contain a plurality of stacked members to be coated, each of said magazines being positioned at opposite sides respectively of said moving conveyor means, means to alternately feed successive members from first one and then the other of said magazines into successive positions on said conveyor belt, means to position the respective member fed from each magazine on respective opposite sides of said conveyor means whereby successive ones of said members are supported in a different position and then are tilted in opposite directions to the vertical to provide abutting connections between members for moving the train of members formed thereby in the direction of conveyor means movement, the central notched portion in the abutting ends of each of said members providing an interlock connection between the members in the train of members thus formed, a plurality of longitudinally extending discontinuous track supporting means adapted to act on said train of sheet-like members and guide the longitudinal path of movement thereof and maintain the tilted positions of said members to be coated during their longitudinal movement thereon, and coating means positioned along the path of movement of said train of members on opposite sides of said members for coating all exposed surfaces of said members.

16. A machine for treating in continuous succession the surfaces of each of a plurality of sheet-like members formed of relatively stiff material including in combination, a housing, driving means positioned externally of said housing for impelling a train of the sheet-like members continuously through said housing with successive ones of the members abutting one another in planes oppositely inclined to the vertical, a plurality of double-grooved track supports positioned within said housing above and below the members to engage in alternate grooves the edges of successive ones of the sheet-like members so as to guide the train of successive members through said housing and maintain the members in their aforesaid inclined positions, and means positioned within said housing for treating the surface of each of the sheet-like members as the members are impelled through said housing by said driving means.

References Cited in the file of this patent

UNITED STATES PATENTS

| | | |
|---|---|---|
| 1,508,116 | Nantus | Sept. 9, 1924 |
| 1,655,290 | Phelps et al. | Jan. 3, 1928 |
| 2,002,507 | Porter | May 28, 1935 |
| 2,217,724 | Birmingham | Oct. 15, 1940 |
| 2,249,521 | Graham et al. | July 15, 1941 |
| 2,337,282 | Stewart | Dec. 21, 1943 |
| 2,350,569 | Reynolds | June 6, 1944 |
| 2,383,947 | Wensel et al. | Sept. 4, 1945 |
| 2,421,343 | Mageoch | May 27, 1947 |
| 2,542,623 | Cohen | Feb. 20, 1951 |